US012211682B2

(12) United States Patent
Mourad et al.

(10) Patent No.: US 12,211,682 B2
(45) Date of Patent: Jan. 28, 2025

(54) METHODS AND SYSTEMS FOR PROCESSING MASS SPECTRA

(71) Applicant: Thermo Fisher Scientific (Bremen) GmbH, Bremen (DE)

(72) Inventors: Daniel Mourad, Bremen (DE); Arne Kreutzmann, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 640 days.

(21) Appl. No.: 17/540,178

(22) Filed: Dec. 1, 2021

(65) Prior Publication Data

US 2022/0189753 A1 Jun. 16, 2022

(30) Foreign Application Priority Data

Dec. 10, 2020 (EP) .................................... 20213164

(51) Int. Cl.
*H01J 49/00* (2006.01)

(52) U.S. Cl.
CPC ................................ *H01J 49/0036* (2013.01)

(58) Field of Classification Search
CPC .... H01J 49/0036; H01J 49/38; H01J 49/4245; H01J 49/425; G01N 27/62; G06F 17/141; G06F 17/16
USPC ......... 250/281, 282, 288; 702/22, 23, 24, 27
See application file for complete search history.

(56) References Cited

U.S. PATENT DOCUMENTS 9,000,364 B2 * 4/2015 Ermakov ............ H01J 49/4245 250/281

* cited by examiner

*Primary Examiner* — Michael Maskell
(74) *Attorney, Agent, or Firm* — Thomas F. Cooney

(57) ABSTRACT

There is provided a method of identifying spurious peaks in a mass spectrum produced from a time-varying transient signal detected in a mass spectrometer. The method comprises the steps of generating, using a regularized inversion algorithm having one or more adjustable parameters, a first mass spectrum from the time-varying transient signal, according to a first set of values of said one or more adjustable parameters. Generating, using the regularized inversion algorithm, one or more perturbed mass spectra from the transient signal, according to one or more respective perturbed versions of the first set of values. Identifying one or more spurious peaks in the first mass spectrum by comparing the first mass spectrum with at least one of the perturbed mass spectra. There are also provided corresponding systems and computer readable media.

21 Claims, 12 Drawing Sheets

METHODS AND SYSTEMS FOR PROCESSING MASS SPECTRA

CROSS REFERENCE TO RELATED APPLICATION

This application claims, under 35 U.S.C. 119(a), the right of priority to European Patent Application No. 20213164.5, which was filed on Dec. 10, 2020, the disclosure of which is incorporated herein by reference in its entirety.

FIELD OF THE INVENTION

The present invention relates to systems and methods for identifying spurious peaks in mass spectra, in particular spurious peaks arising from application of regularized inversion algorithms.

BACKGROUND OF THE INVENTION

A goal of the family of analytical techniques commonly referred to as Mass Spectrometry is to characterize samples by identification of the ionic species, along with their relative abundances, that are produced when a sample is ionized, and possibly fragmented. A plot of the masses (or mass to charge ratios) of the ionic species vs. their relative abundances is what is typically known as a mass spectrum. However, the finite accuracy of Mass Spectrometry techniques can lead to difficulties resolving different ionic species with similar mass to charge ratios present in the experiment. In particular, the resulting mass spectrum may contain what appears to be individual peaks which are in reality convolutions of two or more adjacent peaks, each corresponding to different ionic species. It is appreciated that such convolutions can lead to errors in the characterization of samples as important ionic species may be overlooked, and the abundances of other ionic species may be over or under reported.

As such numerous techniques have been developed that attempt to improve the resolving power of mass spectrometry through post-processing of mass spectrometry data. In particular, a number of techniques attempt to improve resolution by in effect de-convolving peaks in mass spectra through post processing. Such convolutions, and attempts to mitigate them can most easily be understood in the field of Fourier Transform Mass Spectrometry (FTMS).

In FTMS the ionic species, along with their relative abundances present, are identified in the form of coherently oscillating ion packets contained by the trapping field within a mass spectrometer. The frequency of oscillation of a coherent packet of ions is a function of the mass to charge ratio of the ionic species and is referred to herein as the "characteristic frequency" of an ionic species. The trapping field can be provided by the combination of an electrostatic field and a magnetostatic field, for example in a Fourier Transform Ion Cyclotron Resonance (FTICR) mass analyser, or by an electrostatic field only, for example in an orbital trapping mass analyser, such as an Orbitrap™ mass analyser from Thermo Fisher Scientific™. FTMS using RF fields is also known.

Typically, ions are detected by an image current S(t) (also termed a continuous transient image current and herein referred to as the "transient" or "time-varying transient signal") induced on detection electrodes of the mass analyser as the oscillating ions pass nearby. Therefore, the transient comprises a superposition of one or more periodic signals. Each periodic signal corresponds to the oscillation of a respective coherent packet of ions within the mass analyser with a respective characteristic frequency. The transient is only measured (or captured or recorded) over a finite time T, termed the "duration" of the transient.

The transient processing usually involves a discrete Fourier transform (DFT), which decomposes the transient into a number of periodic functions (also termed Fourier basis functions). Each Fourier basis function is localized at a respective frequency (also termed a Fourier Transform bin). The frequencies corresponding to the Fourier basis functions form a set of frequencies (referred to as the Fourier grid). The Fourier basis functions are equally spaced in the frequency domain i.e. the separation between adjacent frequencies is a constant. In particular, the separation between adjacent frequencies in the set of frequencies (herein referred to as the "separation" of the set of frequencies) is determined by the inverse of the duration of the transient $$\frac{1}{T}.$$

The decomposition comprises calculating, based on the transient, individual complex amplitudes corresponding to each Fourier basis function. Thereby a set of complex amplitudes is formed. Therefore, the discrete Fourier transform (DFT) represents the transient in the frequency domain. In particular, the transient is represented as a set of complex amplitudes. Each complex amplitude of the set of complex amplitudes corresponds to a respective frequency of the set of frequencies i.e. the frequency at which the corresponding Fourier basis function is localized.

The periodic signals present in the transient (as described previously) are related to the complex amplitudes. In particular, the periodic signal will contribute to the complex amplitudes corresponding to a plurality of frequencies in the set of frequencies. The plurality of frequencies will be substantially centred on the characteristic frequency of a particular ionic species for given experimental conditions. Therefore, a plot of the set of complex amplitudes against the set of frequencies will show one or more peaks, each peak substantially centred on a respective characteristic frequency present in the transient i.e. the centroid of each peak will be substantially equal to the characteristic frequency.

As described above, the frequencies of the periodic signals present in the transient are a function of the m/z ratios of the ionic species. Therefore, the centroid of each peak can be converted (or transformed or interpreted) from a frequency into a respective m/z ratio thereby identifying a respective ionic species. Furthermore, the height of each peak can be converted (or transformed or interpreted) into the respective relative abundance of the respective ionic species.

In this regime it is clear that convolutions of adjacent peaks can arise. In particular, due to the spacing of frequencies in the Fourier grid, if two (or more) different ionic species have characteristic frequencies that are sufficiently near a common frequency point on the Fourier grid then the peak in the mass spectra at that point will represent a convolution of the separate peaks for the two (or more) ionic species. In effect, when a transient comprises two or more close characteristic frequencies, the mass spectrum comprises two or more overlapping peaks. If the separation (or difference) between two characteristic frequencies of the transient is less than a threshold value, then the two peaks will not be resolved. This error leads to errors in the converted m/z ratios (and therefore ionic species being identified incorrectly) along with errors in the converted relative abundances. Although it depends on the local spectral density, the practical threshold value for reliable resolution is typically twice the separation of the Fourier grid corresponding to the transient. It will also be appreciated that the reliable resolution for a given sample may also be affected by the phase relationship between various components of the various ionic species, which may give rise to constructive or destructive interference between adjacent components. Such effects may be implicitly accounted for in the spectral density, where explicit phase dependence is cancelled out.

FIG. 1*a* of the accompanying drawings shows an example of such a problem. The figure shows a first signal 150 of a transient, a second signal 160 of the transient and a spectrum 170 of the transient. The first signal 150 has a characteristic frequency $f_1$. The second signal 160 has a characteristic frequency $f_2$. The difference between $f_1$ and $f_2$ is equal to the separation of the Fourier grid. The spectrum 170 has two central peaks. The leftmost peak of the spectrum 170 corresponds to the second signal 160. The rightmost peak of the spectrum 170 corresponds to the first signal 150. There is also an error 174 between the centroid of the peak and the associated characteristic frequency. There is an error 172 between the height (or intensity) of the peak and the height (or intensity) of the corresponding signal 150, 160. The errors become more pronounced as the spectral density (i.e. number of harmonic components for a given region of a spectrum) increases, and their separation diminishes. As set out above in relation to the reliable resolution, such errors may also be affected by the phase relationship between various components of the various ionic species, which may give rise to constructive or destructive interference between adjacent components.

FIG. 1*b* of the accompanying drawings illustrates the problem. The figure shows a first signal 150 of a transient, a second signal 160 of the transient and a spectrum 170 that will be reproduced from the transient. In this case, the difference between $f_1$ and $f_2$ is equal to half the separation of the Fourier grid. The spectrum 170 has a single peak i.e. the characteristic frequencies corresponding to the two signals 150, 160 are not resolved. The centroid of the single peak of the spectrum is in error compared to either of the two characteristic frequencies. Additionally, the height of the single peak is neither equivalent to the sum of the heights of the two signals 150, 160 nor either one of the heights of the two signals 150, 160. Due to these errors, neither of the ionic species corresponding to the signals 150, 160 will be correctly identified. Also the relative abundance reported from the peak will be incorrect. This may lead to errors in abundance ratios calculated using other peaks in the signal 170 which may, themselves be accurate.

In order to address these problems deconvolution techniques have been developed which seek to de-convolve (or decompose) such convolved peaks into separate component peaks, and thus produce an improved mass spectrum. Typically, such approaches involve constructing a new mass spectrum on a finer Fourier grid (i.e. a grid with a reduced frequency spacing) and fitting the new mass spectrum on the finer grid to the original mass spectrum on the coarser grid. In effect, the original mass spectrum is deconvolved onto the finer grid.

It will be appreciated that such a deconvolution is inherently an ill-posed problem. In particular, there may be more than one possible solution, in this case more than one possible deconvolved mass spectra. Equally, it will be appreciated that such a problem is also inherently numerically ill-conditioned. In order to mitigate this deconvolution technique typically make use of the mathematical technique of regularization to attempt to provide stable solutions. An example of such a deconvolution technique is the "Phase-constrained spectrum deconvolution method" (known as ϕSDM, and referred to herein for clarity as PSDM) set out in (see Grinfeld, D., Aizikov, K., Kreutzmann, A., Damoc, E., and Makarov, A., "Phase-constrained spectrum deconvolution for Fourier transform mass spectrometry." Anal. Chem., 89 (2): 1202-1211 (2017), and also European patent publication EP3086354 (A1) the entirety of which is incorporated herein by reference. This technique uses regularization in the form of a phase constraint on the calculated complex amplitudes on the finer grid.

Nevertheless, even using regularization deconvolution techniques typically produce mass spectra having additional, spurious, peaks. These are artefacts of the ill-conditioned and ill-posed nature of the deconvolution and do not represent actual ionic species present in the detected by the mass spectrometer. The presence of these spurious peaks, however, reduces the accuracy of the mass spectrum and can lead to errors when attempting to characterize the original sample using said mass spectrum.

SUMMARY OF THE INVENTION

The present invention seeks to provide systems and methods for more accurately identifying spurious peaks in mass spectra arising from a deconvolution process. In particular, by varying the parameters used in a deconvolution process applied to an initial mass spectrum a number of perturbed mass spectra may be generated. The spurious peaks may then be identified as the peaks that are not substantially invariant to changes in the parameters.

In a first aspect there is provided a method of identifying spurious peaks in a mass spectrum produced from a time-varying transient signal detected in a mass spectrometer. The method comprises generating (or calculating or otherwise forming), using a regularized inversion algorithm (such as a phase constrained spectrum deconvolution algorithm) having one or more adjustable parameters, a first mass spectrum from the time-varying transient signal, according to a first set of values of said one or more adjustable parameters. In some embodiments this step of generating comprises applying the regularized inversion algorithm to an initial mass spectrum generated from the time-varying transient signal. The initial mass spectrum may be formed by applying a discrete Fourier transform to the time-varying transient signal. It will be appreciated that the initial mass spectrum may be generated as part of the method, or it may be generated or constructed separately and received.

The method continues by generating (or calculating or otherwise forming), using the regularized inversion algorithm, one or more perturbed mass spectra from the transient signal, according to one or more respective perturbed versions of the first set of values. Again, in some embodiments this step of generating comprises applying the regularized inversion algorithm to the initial mass spectrum generated from the time-varying transient signal. Each perturbed version of the first set of values may be formed by applying at least one respective change to at least one value of the first set of values.

In this aspect one or more spurious peaks are identified in the first mass spectrum by comparing the first mass spectrum with at least one of the perturbed mass spectra. In some embodiments at least one of the spurious peaks is identified based on the absence of said peak from an intersection of the first mass spectrum and at least one of the perturbed mass spectra. Additionally, or alternatively, at least one of the spurious peaks may be identified based on a change in the mass to charge ratio (which may be represented as a mass value or a frequency) of the peak between the first mass spectrum and at least one of the perturbed mass spectrum exceeding a predetermined threshold.

In some embodiments the regularized inversion algorithm comprises applying a discrete Fourier transform to a version of the time-varying transient signal, said version of the time-varying signal comprising a number of zero blanked entries. In some cases, the one of the one or more adjustable parameters controls the number of zero blanked entries in the version of the time-varying transient.

In some embodiments the regularized inversion algorithm is an iterative algorithm. One of the one or more adjustable parameters may control the number of iterations in the regularized inversion algorithm.

In some embodiments the method further comprising outputting a revised mass spectrum. This revised mass spectrum may take account of the identified spurious peaks. For example, the revised mass spectrum may have one or more (or all) of the identified one or more spurious peaks are excluded. Additionally, or alternatively one or more (or all) of the spurious speaks may be present in the revised mass spectrum and flagged (or identified or otherwise marked) as (potentially) spurious.

The invention also provides apparatus corresponding to, and comprising elements, modules or components arranged to put into effect the above methods, for example one or more various suitably configured computing devices such as those described previously.

In particular, the invention therefore provides a system (or apparatus) for identifying spurious peaks in a mass spectrum produced from a time-varying transient signal detected in a mass spectrometer. The system comprises a deconvolution module configured to generate (or calculate or otherwise form), using a regularized inversion algorithm (such as a phase constrained spectrum deconvolution algorithm) having one or more adjustable parameters, a first mass spectrum from the time-varying transient signal, according to a first set of values of said one or more adjustable parameters. In some embodiments the generating comprises applying the regularized inversion algorithm to an initial mass spectrum generated from the time-varying transient signal. The initial mass spectrum may be formed by applying a discrete Fourier transform to the time-varying transient signal. It will be appreciated that the initial mass spectrum may be generated as part of the method, or it may be generated or constructed separately and received.

The deconvolution module is also configured to generate, using the regularized inversion algorithm, one or more perturbed mass spectra from the transient signal, according to one or more respective perturbed versions of the first set of values. Again, in some embodiments this generating comprises applying the regularized inversion algorithm to the initial mass spectrum generated from the time-varying transient signal.

The system further comprises comparison module configured to identify one or more spurious peaks in the first mass spectrum by comparing the first mass spectrum with at least one of the perturbed mass spectra. In some embodiments at least one of the spurious peaks is identified based on the absence of said peak from an intersection of the first mass spectrum and at least one of the perturbed mass spectra. Additionally, or alternatively, at least one of the spurious peaks may be identified based on a change in the mass to charge ratio (or mass or frequency) of the peak between the first mass spectrum and at least one of the perturbed mass spectrum exceeding a predetermined threshold.

The invention also provides one or more computer programs suitable for execution by one or more processors, such computer program(s) being arranged to put into effect the methods outlined above and described herein. The invention also provides one or more computer readable media, and/or data signals carried over a network, which comprise (or store thereon) such one or more computer programs.

BRIEF DESCRIPTION OF THE DRAWINGS

The present invention may be put into practice in various ways, a number of which will now be described by way of example only and with reference to the accompanying drawings in which.

DETAILED DESCRIPTION OF EMBODIMENTS OF THE INVENTION

In the description that follows and, in the figures, certain embodiments of the invention are described. However, it will be appreciated that the invention is not limited to the embodiments that are described and that some embodiments may not include all of the features that are described below.

It will be evident, however, that various modifications and changes may be made herein without departing from the broader spirit and scope of the invention as set forth in the appended claims.

Figure 1A:
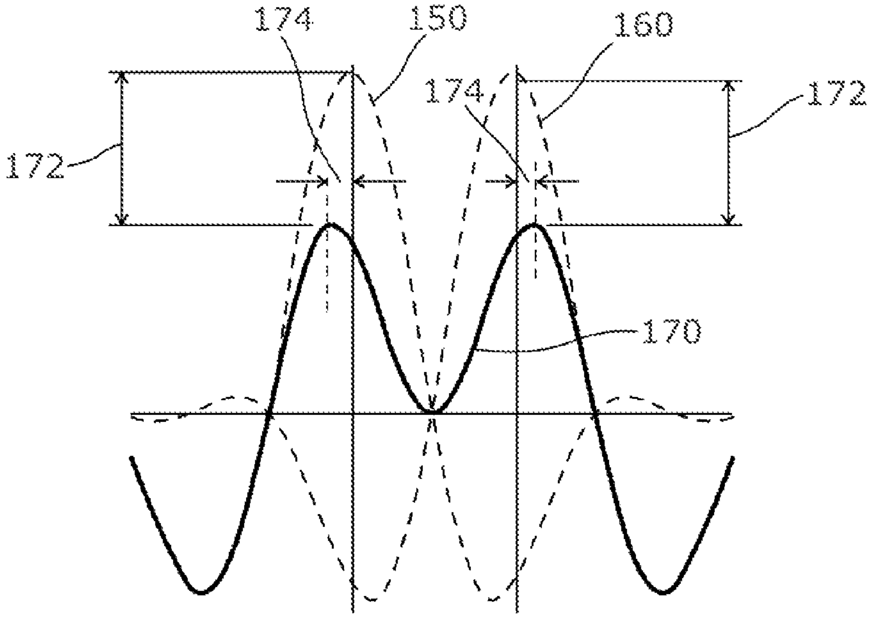
FIG. 1*a* shows an example of a known resolution problem.
Figure 1B:
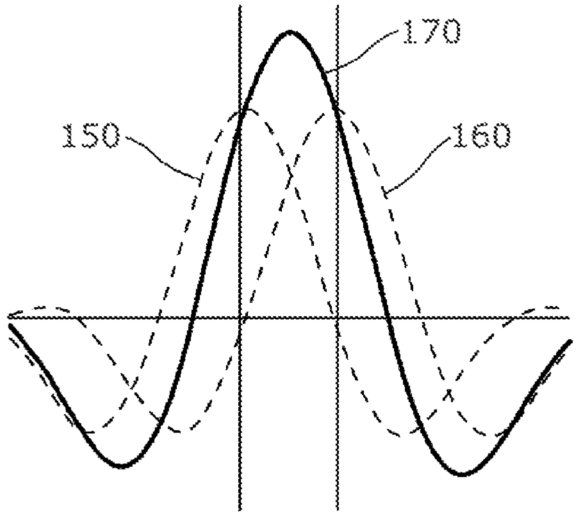
FIG. 1*b* shows another example of a known resolution problem.
Figure 2:
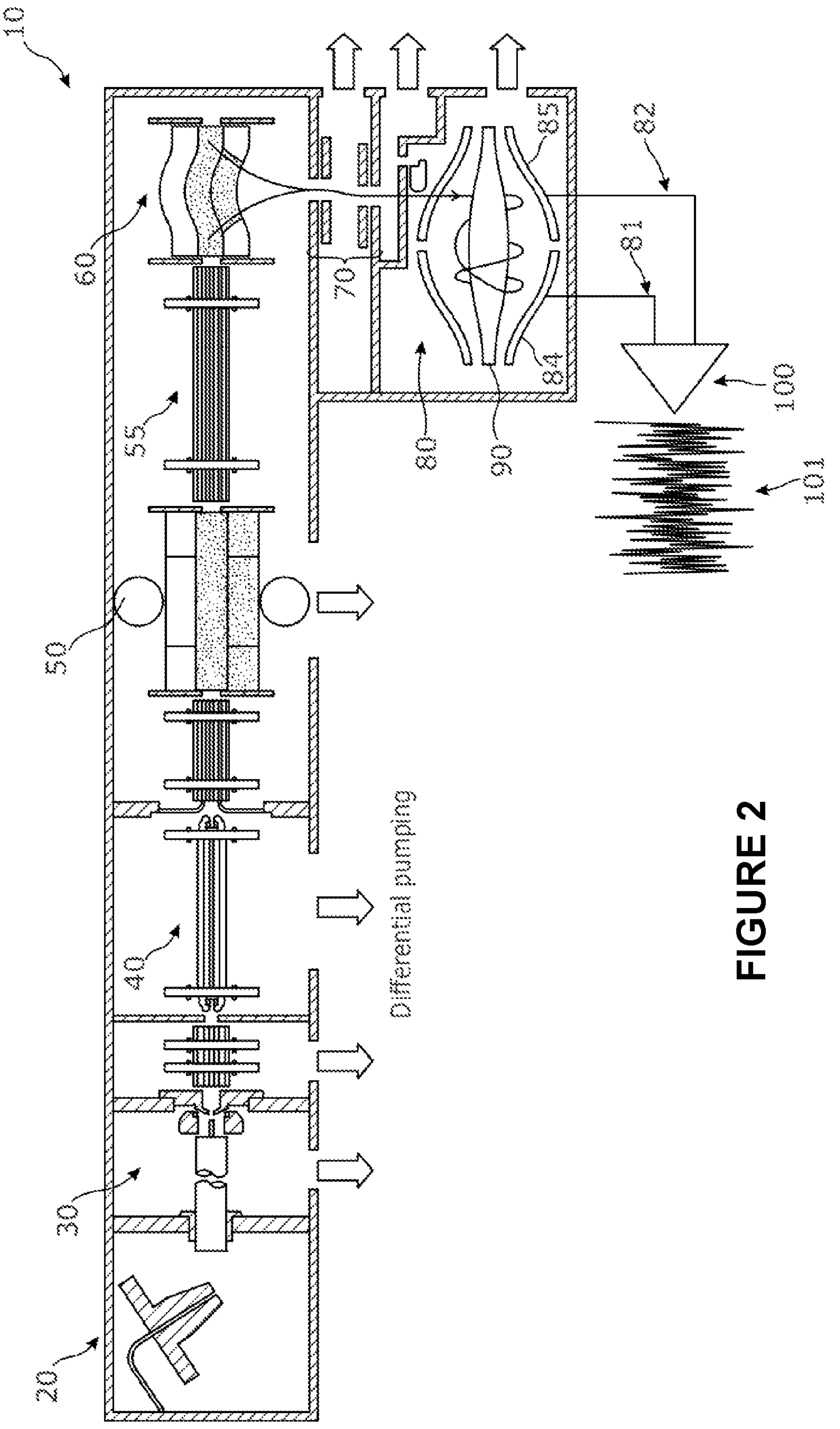
FIG. 2 shows a schematic arrangement of a typical mass spectrometer.

FIG. 2 shows a schematic arrangement of a typical orbital trapping type mass spectrometer, marketed under the name Orbitrap™ by Thermo Fisher Scientific™. The arrangement of FIG. 2 is described in detailed in commonly assigned WO-A-02/078046 the entire contents of which are incorporated herein by reference, and will not be described in detail here. A brief description of FIG. 2 is, however, included in order to understand the use and purpose of the mass spectrometer better.

As seen in FIG. 2, the mass spectrometer 10 includes a continuous or pulsed ion source 20 which generates gas-phase ions. These pass through an ion source block 30 into an RF transmission device 40, which cools ions by collisions with gas. The cooled ions then enter a mass filter 50, which extracts only those ions within a window of m/z ratios of interest. Ions within the mass range of interest then proceed into a linear trap 60 (typically, a C-trap), which stores ions in a trapping volume through application of an RF potential to a set of rods (typically quadrupole, hexapole or octapole).

As explained in more detail in WO-A-02/078046, ions are held in the linear trap 60 in a potential well, the bottom of which may be located adjacent to an exit electrode thereof. Ions are ejected out of the linear trap 60 into a lens arrangement 70 by applying a DC pulse to the exit electrode of the linear trap 60. Ions pass through the lens arrangement 70 along a line that is curved to avoid gas carry-over, and into an electrostatic trap 80 (also known as a mass analyser). In FIG. 2, the electrostatic trap 80 is of the so-called orbital trapping type, marketed as "Orbitrap"™ by Thermo Fisher Scientific™, which contains a split outer electrode 84, 85 and an inner electrode 90.

In operation, a voltage pulse is applied to the exit electrode of the linear trap 60 so as to release trapped ions. The ions arrive at the entrance to the electrostatic trap 80 as a sequence of short, energetic packets, each packet comprising ions of a similar m/z ratio.

The ions enter the electrostatic trap 80 as coherent bunches and are squeezed towards the central electrode 90. The ions are then trapped in an electrostatic field such that they oscillate along the central electrode with the frequencies depending on their m/z ratios. Image currents are detected by the first outer electrode 84 and the second outer electrode 85, providing first harmonic transient signal 81 and second harmonic transient signal 82 respectively. These two signals are then processed by a differential amplifier 100 and provide a transient image current signal 101 (herein referred to as the transient).

Therefore, the transient 101 comprises a superposition of one or more periodic signals (or harmonic spectral components). Each periodic signal corresponds to the oscillation of a respective coherent packet of ions within the mass analyser with a respective characteristic frequency determined by the m/z ratio of the ions.

It will be appreciated that the mass spectrometer 10 outlined above serves merely as an exemplar as to how the transient 101 may be generated. The embodiments of the invention presented below may use any suitable transient 101 produced by any mass spectrometer 10. In particular, whilst the mass spectrometer described above is an Orbitrap™ mass spectrometer, a particular example of a mass spectrometer that uses an orbital trapping electrostatic trap, the embodiments of the invention described below are not limited to such a mass spectrometer.

As described above, the frequencies of the periodic signals present in the transient are a function of the m/z ratios of the ionic species. Therefore, the centroid of each peak can be converted (or transformed or interpreted) into a respective m/z ratio thereby identifying a respective ionic species. Furthermore, the height, or intensity, of each peak can be converted (or transformed or interpreted) into the respective relative abundance of the respective ionic species. In this way it will be appreciated that a mass in a mass spectrum can be expressed variously as an absolute mass value, a mass-to-charge ratio (m/z), a frequency value, etc. Similarly, the relative abundance in a mass spectrum can be expressed variously as an intensity value, a peak height, etc. In this specification, the term mass spectrum means a spectrum of ion abundance in the mass (e.g. m/z) domain where mass (m/z) values may be expressed as frequency values. As such, it will be appreciated that a reference herein to mass (m/z) includes reference to frequency and vice versa. Consequently, the terms mass spectrum and frequency spectrum are used interchangeably.

Figure 3:
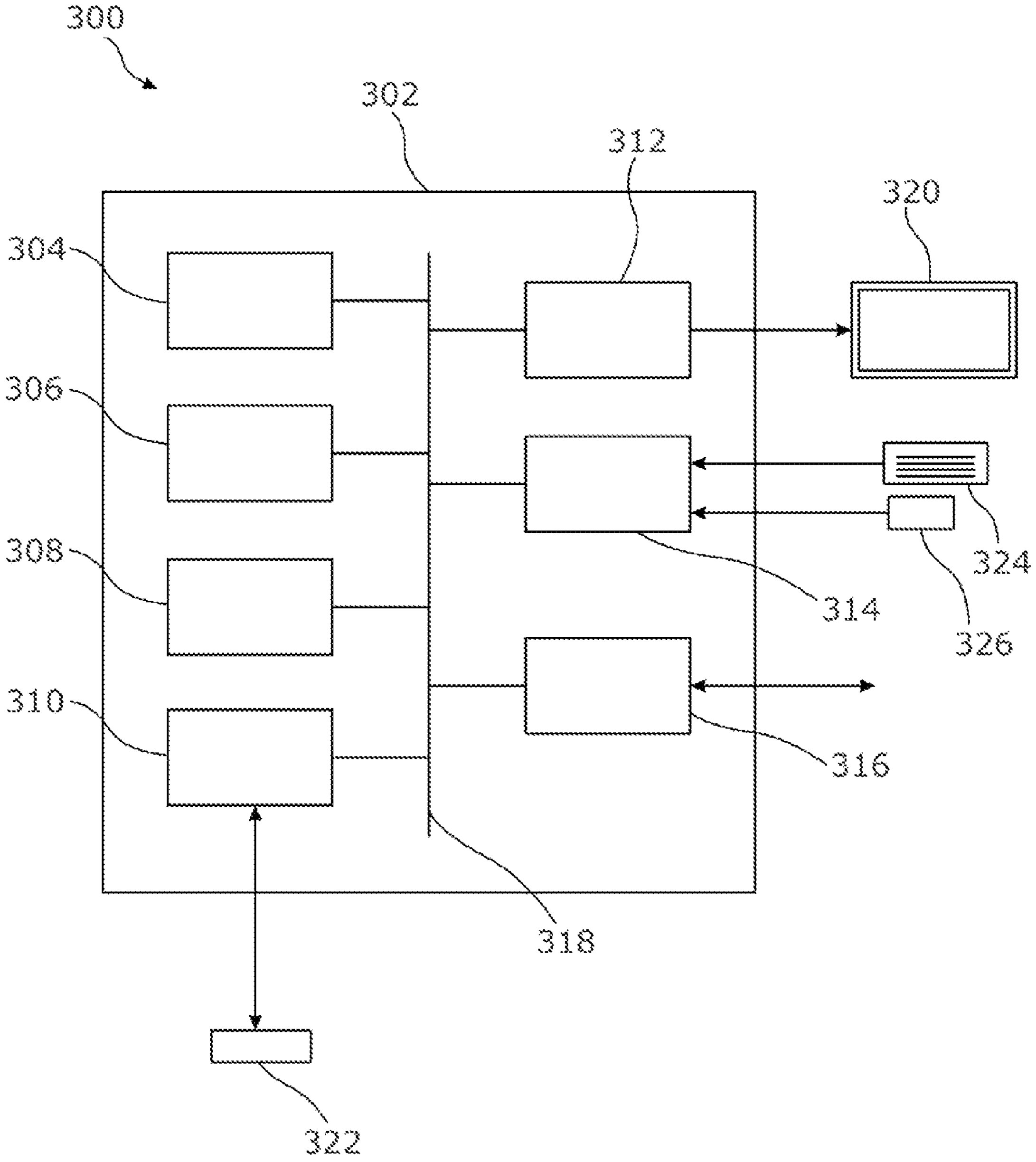
FIG. 3 schematically illustrates an example of a computer system.

FIG. 3 schematically illustrates an example of a computer system 300. The system 300 comprises a computer 302. The computer 302 comprises: a storage medium 304, a memory 306, a processor 308, an interface 310, a user output interface 312, a user input interface 314 and a network interface 316, which are all linked together over one or more communication buses 318.

The storage medium 304 may be any form of non-volatile data storage device such as one or more of a hard disk drive, a magnetic disc, an optical disc, a ROM, etc. The storage medium 304 may store an operating system for the processor 308 to execute in order for the computer 302 to function. The storage medium 304 may also store one or more computer programs (or software or instructions or code).

The memory 306 may be any random access memory (storage unit or volatile storage medium) suitable for storing data and/or computer programs (or software or instructions or code).

The processor 308 may be any data processing unit suitable for executing one or more computer programs (such as those stored on the storage medium 304 and/or in the memory 306), some of which may be computer programs according to embodiments of the invention or computer programs that, when executed by the processor 308, cause the processor 308 to carry out a method according to an embodiment of the invention and configure the system 300 to be a system according to an embodiment of the invention. The processor 308 may comprise a single data processing unit or multiple data processing units operating in parallel, separately or in cooperation with each other. The processor 308, in carrying out data processing operations for embodiments of the invention, may store data to and/or read data from the storage medium 304 and/or the memory 306.

The interface 310 may be any unit for providing an interface to a device 322 external to, or removable from, the computer 302. The device 322 may be a data storage device, for example, one or more of an optical disc, a magnetic disc, a solid-state-storage device, etc. The device 322 may have processing capabilities—for example, the device may be a smart card. The interface 310 may therefore access data from, or provide data to, or interface with, the device 322 in accordance with one or more commands that it receives from the processor 308.

The user input interface 314 is arranged to receive input from a user, or operator, of the system 300. The user may provide this input via one or more input devices of the system 300, such as a mouse (or other pointing device) 326 and/or a keyboard 324, that are connected to, or in communication with, the user input interface 314. However, it will be appreciated that the user may provide input to the computer 302 via one or more additional or alternative input devices (such as a touch screen). The computer 302 may store the input received from the input devices via the user input interface 314 in the memory 306 for the processor 308 to subsequently access and process, or may pass it straight to the processor 308, so that the processor 308 can respond to the user input accordingly.

The user output interface 312 is arranged to provide a graphical/visual output to a user, or operator, of the system 300. As such, the processor 308 may be arranged to instruct the user output interface 312 to form an image/video signal representing a desired graphical output, and to provide this signal to a monitor (or screen or display unit) 320 of the system 300 that is connected to the user output interface 312.

Finally, the network interface 316 provides functionality for the computer 302 to download data from and/or upload data to one or more data communication networks.

It will be appreciated that the architecture of the system 300 illustrated in FIG. 3 and described above is merely exemplary and that other computer systems 300 with different architectures (for example with fewer components than shown in FIG. 3 or with additional and/or alternative components than shown in FIG. 3) may be used in embodiments of the invention. As examples, the computer system 300 could comprise one or more of: a personal computer; a server computer; a laptop; etc.

Figure 4A:
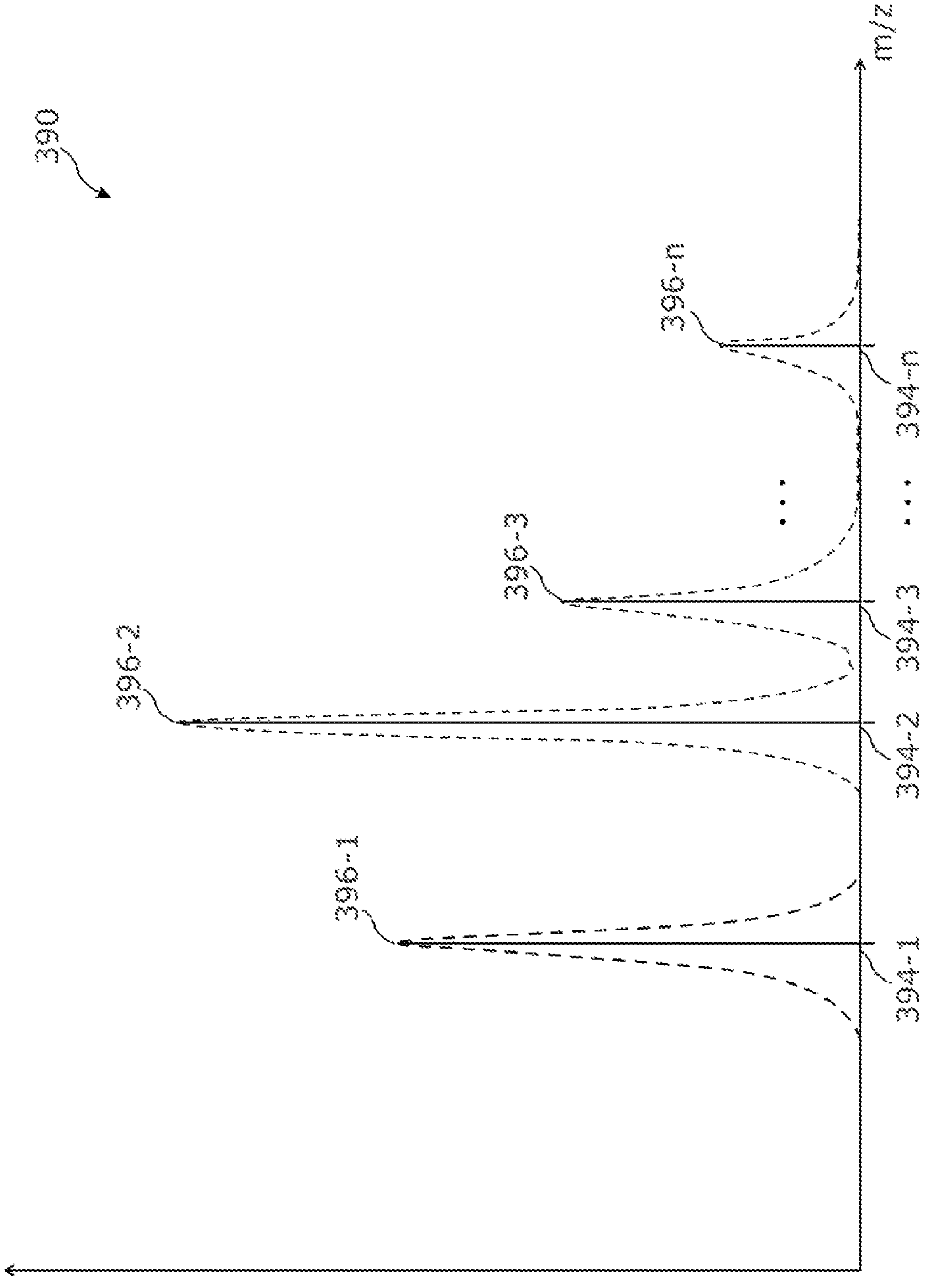
FIG. 4*a* shows an example graphical representation of a mass spectrum.

FIG. 4*a* shows an example graphical representation of a mass spectrum 390.

The mass spectrum 390 comprises one or more m/z values (or mass to charge ratios) 394-*n*. Each m/z value corresponds to a respective ionic species and is equal to the molecular mass of the respective ionic species divided by the absolute elemental charge of the respective ionic species. The mass spectrum 390 comprises one or more intensity values 396-*n* with each intensity value 396-*n* appearing for a respective m/z value 394-*n*. Each intensity value 396-*n* correlates to the relative abundance of the ionic species corresponding to the respective m/z value 394-*n*. Each intensity value 396-*n* may be proportional to the relative abundance of the ionic species corresponding to the respective m/z value.

An experimental mass spectrum such as the mass spectrum 390 may be plotted in the form of a continuum plot, indicated by the dashed line, and a centroid plot, indicated by the vertical solid lines. The widths of peaks indicated by the dashed line represent the limit of the mass resolving power, which is the ability to distinguish two different ionic species with close m/z ratios.

However, it will be appreciated that the mass spectrum 390 does not need to be plotted in the form of a graph. Indeed, the mass spectrum 390 may be represented in any suitable form. For example, the mass spectrum 390 may be represented a list comprising the one or more intensity values 396-*n* and the one or more m/z values 394-*n*.

Figure 4B:
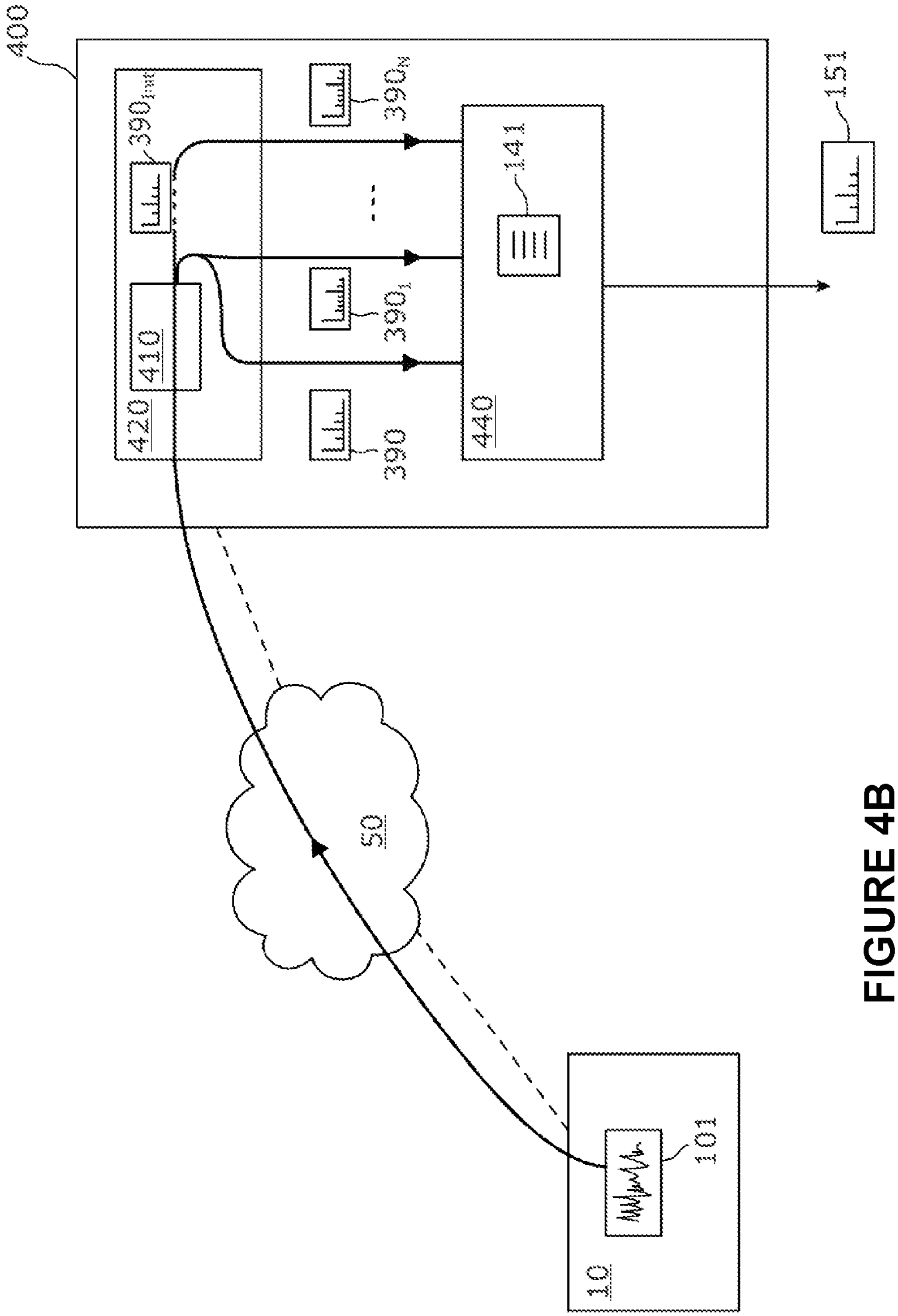
FIG. 4B schematically illustrates an example processing system for identifying spurious peaks.

FIG. 4B schematically illustrates an example processing system 400. The figure shows the processing system 400 generating a number of mass spectra 390; $\mathbf{390}_1$; $\mathbf{390}_N$ all corresponding to a transient 101, such as the transient 101 described previously. FIG. 4B also shows the processing system 400 identifying, from a comparison of the generated mass spectra 390; $\mathbf{390}_1$; . . . ; $\mathbf{390}_N$ one or more spurious peaks in at least one of the mass spectra 390; $\mathbf{390}_1$; . . . ; $\mathbf{390}_N$. The mass spectra 390; $\mathbf{390}_1$; . . . ; $\mathbf{390}_N$ may be as described as above and shown in FIG. 4A. The mass spectra 390; $\mathbf{390}_1$; . . . ; $\mathbf{390}_N$ shown in FIG. 4B comprise a first mass spectrum 390 and two perturbed mass spectra $\mathbf{390}_1$; . . . ; $\mathbf{390}_N$. as discussed below. It will be appreciated however that this number of perturbed mass spectra is shown for ease of understanding and the invention is not limited to two perturbed mass spectra $\mathbf{390}_1$; . . . ; $\mathbf{390}_N$. the invention may be operated with a single perturbed mass spectrum $\mathbf{390}_1$ or more than two perturbed mass spectra $\mathbf{390}_1$; . . . ; $\mathbf{390}_N$.

The processing system 400 comprises a deconvolution module 420, and a comparison module 440. The processing system 400 may be implemented on a computer system 300 as described above with reference to FIG. 3.

The processing system 400 may be communicatively coupled to a mass spectrometer 10. For example, the processing system 400 may be communicatively coupled to the mass spectrometer 10 via the network interface 316. The processing system 400 is arranged to receive the transient 101. For example, the processing system 400 may be arranged to receive the transient 101 via any of: the network interface 316; the input interface 310; the user input interface 314; etc. The processing system 400 may be arranged to have stored thereon the transient 101. For example, the transient 101 may be stored on the storage device 304.

The transient 101 can be represented by a time varying function S(t). The transient is only measured (or captured or recorded) over a finite time T, termed the "duration" of the transient. For the purposes of discussion the time varying function S(t) representing the transient is shown as a continuous function of time, t. However, it will be appreciated that the transient 101 may also, or alternatively, be sampled. In particular, the transient may be represented by a set of values $S_{t_k}$, where $S_{t_k}=S(t_k)$, for a set of times $t_0$, $t_1$, . . . , $t_N$. The transient may be sampled at a regular time interval. For example, $t_k=k\Delta t$, where k is an integer number and Δt is a regular time interval.

The deconvolution module 420 comprises a transient processing module 410. The transient processing module 410 is arranged to generate (or calculate, or otherwise produce) an initial mass spectrum $\mathbf{390}_{Init}$ from the transient 101. It will be appreciated that the technique used to generate this, the initial mass spectrum $\mathbf{390}_{Init}$, will be dependent on the mass spectrometer 10 used to generate the transient 101. For example, if the mass spectrometer 10 is of the FTMS type (for example, an Orbitrap™ mass analyser or an FT-ICR mass analyser) the generation of a mass spectrum from a transient will typically involve performing a discrete Fourier transform on said transient 101. It will be appreciated that the generation of mass spectra from transients produced by mass spectrometers would be a routine task for a person skilled in the art and as such is not described in any further detail herein.

In line with the above discussions it will be appreciated that the initial mass spectrum $\mathbf{390}_{Init}$ may include a number of convolved peaks for which it would be desirable to deconvolve (or decompose) in order to improve the accuracy of the mass spectrum. The deconvolution module 420 is arranged to generate (or calculate, or otherwise produce) a mass spectrum 390; $\mathbf{390}_1$; . . . ; $\mathbf{390}_N$ corresponding to the time varying transient signal 101. In particular, the deconvolution module 420 is arranged to use a regularized inversion (or deconvolution) algorithm to generate the mass spectrum 390; $\mathbf{390}_1$; . . . ; $\mathbf{390}_N$. Regularized deconvolution algorithms will be discussed shortly below, however, it will be appreciated that such a regularized deconvolution algorithm seeks to deconvolve one or more peaks in an initial mass spectrum, such as the initial mass spectrum $\mathbf{390}_{Init}$, typically generating another mass spectrum 390;

$390_1$; . . . ; $390_N$ as an output where some or all of the peaks have been deconvolved. The algorithm is subject to one or more adjustable parameters which may be varied, typically, to ensure the convergence of the algorithm to a solution. Examples of such regularized deconvolution algorithms include PSDM, and regularized deblurring. In regularized deblurring a deblurring kernel (such as a Gaussian) is approximately compensated by subsequent deconvolution and regularization under a suitably chosen penalty constraint. An example of regularized deblurring is set out in Mueller, J. L., Siltanen, S., "*Linear and Nonlinear Inverse Problems with Practical Applications*" (2012), Cambridge University Press. ISBN 978-1-61197-233-7, which is incorporated herein by reference in its entirety.

The nature of the adjustable parameters typically varies between different regularized inversion algorithms. However, a number of regularized inversion algorithms are iterative. In other words, the regularized inversion algorithm may comprise an iterative procedure, such as an optimization procedure. In such cases an adjustable parameter which governs the number of iterations may be used. For example, the adjustable parameter may be a maximum number of iterations; a convergence threshold which terminates the iterative procedure if met; a time limit (such as a wall time, or a number of processing cycles) which terminates the iteration procedure if exceeded; and so on and so forth. It will also be appreciated that many regularized inversion algorithms blank a number of entries of the time varying transient prior to processing. Typically, it is entries at the beginning or the end of the time varying transient that are blanked, for example to eliminate or reduce boundary effects where the signal is substantially aperiodic (such as due to voltage build up). In such cases the adjustable parameter which governs the blanking may be used. For example, the adjustable parameter may be a number of blanked entries of the time-varying transient; signal threshold which if the time varying transient does not exceed results that portion of the time varying transient being blanked; and so on and so forth.

The values of the adjustable parameters of the regularized inversion algorithm used when generating the mass spectrum form a set of values of said adjustable parameters that correspond to the generated mass spectrum 390; $390_1$; . . . ; $390_N$. The deconvolution module 420 is arranged to generate two or more mass spectra 390; $390_1$; . . . ; $390_N$ using different sets of values of said adjustable parameters. In particular, a first mass spectrum 390 is generated using a first set of values of the adjustable parameters, and at least one perturbed mass spectrum $390_1$; . . . ; $390_N$ is produced using at least one perturbed version of the first set of values of the adjustable parameters. A perturbed version of the first set of values is a set of values where at least one of the values differs from the corresponding value in the first set of values. The difference (or differences) between the values in the first set of values and the values in the perturbed version of the first set of values is typically small relative to the size of the value in question. However, it will be appreciated that in some cases the difference may be large.

The first set of values it typically chosen based on convergence criteria of the regularized inversion algorithm. In particular, the first set of values may be chosen such as to provide a suitably converged first mass spectrum. In this way, the first set of values may be chosen automatically such as by the deconvolution module 420. Additionally, or alternatively, the first set of values may be selected at least in part by a user or by user input to an automatic selection process. It will be appreciated that the selection of the first set of values is dependent on the regularized inversion algorithm. Similarly, the generation of the perturbed versions of the first set of values may be automatic. Additionally, or alternatively, the selection of the generation of the perturbed versions of the first set of values may, at least in part, be carried out by a user or be performed based on user input to an automatic generation process.

The comparison module 440 is arranged to identify one or more spurious peaks in the first mass spectrum 390 by comparing the first mass spectrum 390 with at least one of the perturbed mass spectra $390_1$; . . . ; $390_N$. In particular, comparison module 440 may identify a peak which is present in the first mass spectrum 390 and not present in one or more of the perturbed mass spectra $390_1$; . . . ; $390_N$ as a spurious peak additionally, or alternatively, a peak in the first mass spectrum 390 may be identified as a spurious peak if said peak appears in at least one of the perturbed mass spectra $390_1$; . . . ; $390_N$ at a frequency (or m/z value) shifted by more than a predetermined threshold value relative to its position in the first mass spectrum. It will be appreciated, that a number of related criteria may be used in combination or separately to determine spurious peaks. A peak may be determined as spurious if it is unstable across one or more mass spectra. In particular, an unstable peak may be one whose frequency varies by more than a predetermined threshold between one or more of the mass spectra 390; $390_1$; . . . ; $390_N$. For example, a peak may be considered stable when its frequency position does not change more than half a bin width of the frequency grid of the mass spectra 390; $390_1$; . . . ; $390_N$. Additionally, or alternatively a measure of distance on the intensity axis may be used as a criterion for stability. For example, a peak may be considered stable when its intensity does not change more than a threshold amount. A combination of these criteria may be used. As such, a peak may be considered spurious if it has a distance between the mass spectra based on differences in intensity and/or frequency (m/z) that is more than predetermined threshold. In general, it will be understood that any suitable measure of distance between a peak in two mass spectra may be used to determine whether the peak is spurious or not.

It will also be appreciated that in some examples the comparison module 440 may identify spurious peaks in the first mass spectrum by identifying the peaks in the first mass spectrum that are nonspurious (or valid) and determining the remaining peaks to be spurious. It will be appreciated that criteria for identifying peaks that are spurious may be used in the inverse to identify peaks as valid. For example, a peak may be considered valid if it is present in the intersection of the first mass spectrum and each of the perturbed mass spectra. Typically, a peak will be considered present in two or more mass spectra if there are peaks in each mass spectra that do not vary in frequency by more than the above stability threshold. More generally, a peak may be considered spurious if it has a distance between the mass spectra based on differences in intensity and/or frequency (m/z) that is more than predetermined threshold. Examples for measuring the distances would be (where dM is the frequency (m/z) difference and dI is the intensity difference)

$$|dM|+|dI| \tag{a}$$

$$\sqrt{((dM)^2+(dI)^2)} \tag{b}$$

Additionally, peaks may be classified as suspect (for example neither clearly valid nor invalid). For example, a peak may be defined as "suspect" if it is not present in at least one but not all of the perturbed spectra. The processing system 400 is typically arranged to output the one or more identified spurious peaks. The system may be arranged to output the spurious peaks directly as data representing a set of spurious peaks 145. Additionally, or alternatively, the processing system 400 may be arranged to output the one or more spurious peaks as part of a revised mass spectrum 151. The revised mass spectrum may correspond to the first mass spectrum with the one or more spurious peaks removed. Alternatively, the revised mass spectrum may correspond to the first mass spectrum with the one or more spurious peaks marked (or otherwise identified) as spurious.

Figure 4C:
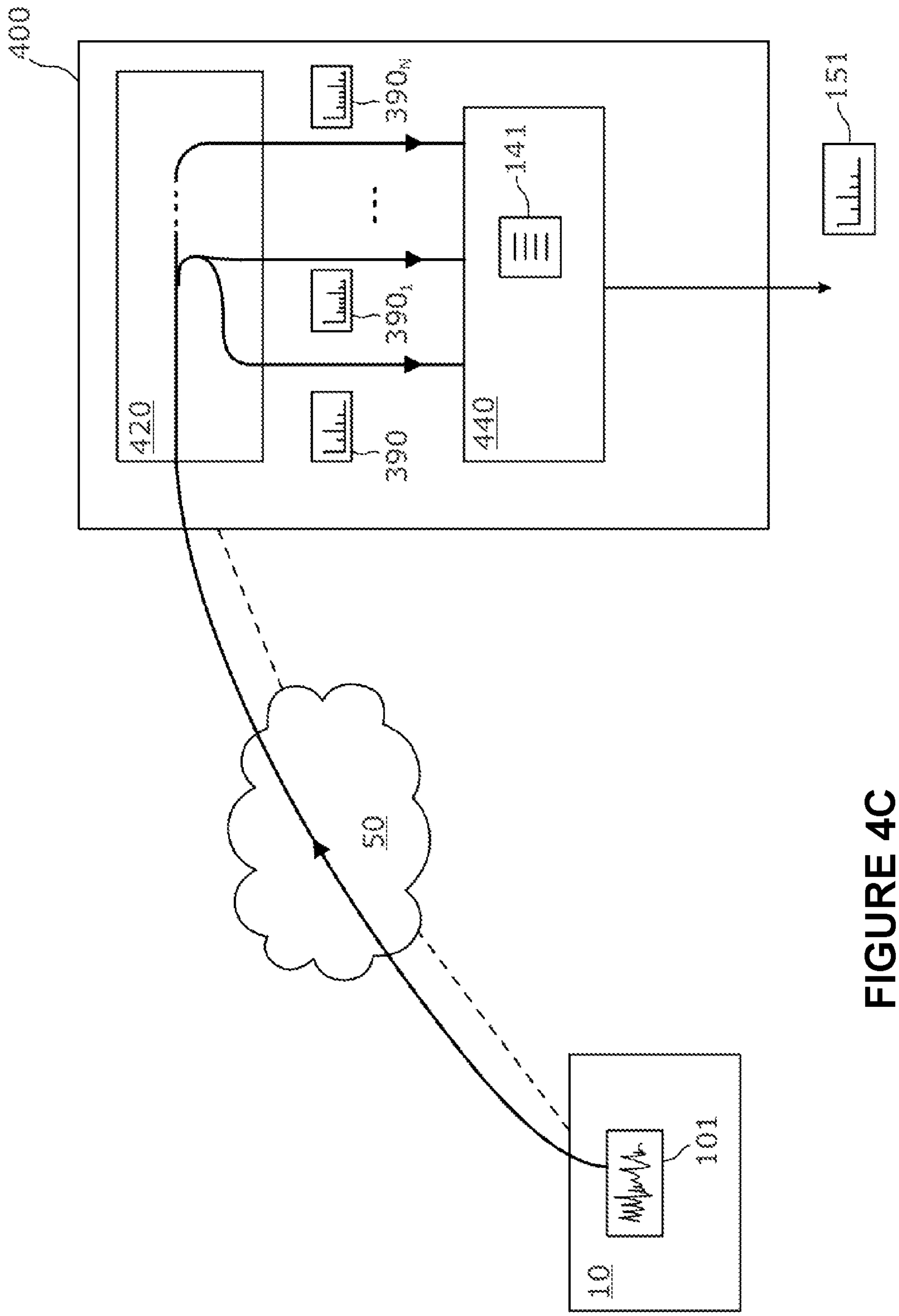
FIG. 4C schematically illustrates a variant example processing system for identifying spurious peaks.

In the processing system 400 described above with reference to FIG. 4B the processing system receives as input the transient 101. However, it will be appreciated that variants of the processing system 400 may directly receive the initial mass spectrum $\mathbf{390}_{Init}$ as input. In particular, as shown in FIG. 4C the processing system 400 receives the initial mass spectrum $\mathbf{390}_{Init}$ as input. The processing system 400 shown in FIG. 4C also omits the mass transient processing module 410. In such cases, it may be assumed that the processing carried out by the mass transient processing module is carried out elsewhere, such as on the mass spectrometer 10 itself.

The processing system 400 may be communicatively coupled to the mass spectrometer 10. For example, the processing system 400 may be communicatively coupled to the mass spectrometer via the network interface 316. The processing system 400 is arranged to receive the initial mass spectrum $\mathbf{390}_{Init}$. For example, the processing system 400 may be arranged to receive the initial mass spectrum $\mathbf{390}_{Init}$ via any of: the network interface 316; the input interface 310; the user input interface 314; etc. The transient processing system 400 may be arranged to have stored thereon the transient 101. For example, the transient 101 may be stored on the storage device 304.

Apart from the changes outlined above it will be appreciated that the variant of the processing system 400 shown in FIG. 4C operates as the processing system 400 shown in FIG. 4B as described above.

As discussed herein regularized inversion may be understood as the proper choice of a restricted inversion scheme to recover a signal which is robust against changes in noise, see for example the already cited Mueller, J. L., Siltanen, S., "Linear and Nonlinear Inverse Problems with Practical Applications" which discusses this. Regularization may be understood as a way by which the degrees of freedom of an inversion method are reduced, with the aim of producing a version of the inversion problem that has a unique (or substantially unique) solution. Typically, regularization is used to introduce prior knowledge of an expected solution into the inversion procedure. For example, in PSDM an expected phase for each of the calculated complex amplitudes is introduced by way of a phase constraint.

As such a regularized inversion algorithm typically comprises an inversion algorithm with (or subject to) one or more constraints. The convergence of the algorithm to a solution is typically governed (or influenced) by one or more parameters. Such parameters may directly control the regularization. For example, in PSDM an example parameter may be the uncertainty (or slack) around the expected phase. Additionally, or alternatively, such parameters may be parameters of the inversion algorithm. For example, in PSDM, such parameters may include any of: the cut-off (or maximum) number of iterations in the optimization, the number of blanked entries in the time varying-transient, or the weighting of optional penalty terms (such as L1-penalty, L2-penalty) in the optimization problem (see for example the already cited Mueller, J. L., Siltanen, S., "Linear and Nonlinear Inverse Problems with Practical Applications").

Figure 5A:
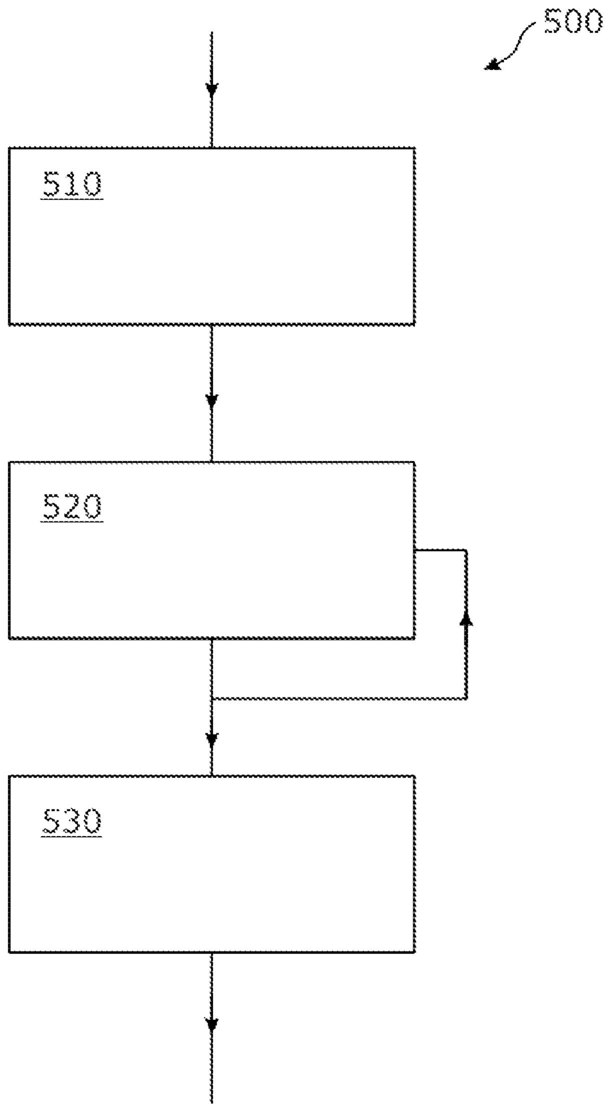
FIG. 5A shows a flow diagram schematically illustrating a method for identifying spurious peaks in a mass spectrum, such as may be carried out by either of the example processing systems in FIGS. 4B and 4C.

FIG. 5A shows a flow diagram schematically illustrating a method 500 for identifying spurious peaks in a mass spectrum. The method 500 may be carried out by a processing system such as either of the example processing systems 400 discussed in relation to FIGS. 4B and 4C above. The mass spectrum is a mass spectrum produced from a time-varying transient signal 101 detected in a mass spectrometer 10. The steps of the method 500 are set out below.

At a step 510 a first mass spectrum is generated using a regularized inversion algorithm. The step 510 may be carried out by the deconvolution module 420. The regularized inversion algorithm has one or more adjustable parameters as discussed shortly below. The first mass spectrum is generated based on (or from) the time varying transient signal 101.

It will be appreciated that the step 510 may comprise applying (or performing) the regularized inversion algorithm on the time-varying transient signal 101. In other words, the first mass spectrum may be generated directly form the time-varying transient signal 101. Alternatively, the step 510 may comprise applying the regularized inversion algorithm to an initial mass spectrum. In this case, the initial mass spectrum is a mass spectrum calculated (or determined or otherwise generated) from the time-varying transient signal 101. The initial mass spectrum may be or correspond to a mass spectrum produced with the standard resolution for the time varying transient signal. For example, for a time varying transient signal produced using an FTMS mass spectrometer 10 the initial mass spectrum may correspond to the mass spectrum produced using the Fourier grid having a separation of 1/T.

The values of the one or more adjustable parameters used to generate the first mass spectrum in the step 510 from a first set of values. For ease of discussion the discussion herein will refer to a set of values, which comprise a respective value for each of the adjustable parameters. However, it will be appreciated that in embodiments where there is a single adjustable parameter, then a set of values will be formed of a single value. The first set of values may typically be a set of values that produce a first mass spectrum that is converged with respect to one or more measures of accuracy. The measures of accuracy and their convergence threshold is typically specified by a user This choice can be based on the convergence of suitable discrepancy measures and/or be limited by real-time processing constraints. For example, the variation between iterations could be used as measure, like a vanishing differential change in one of the spectra or helper spectra in the PSDM output upon iterations. It will be appreciated that adjusting parameters to determine a suitable set of values for producing a suitably converged mass spectrum is procedure that would be routine to the skilled person, and hence is not discussed further herein.

At a step 520 a perturbed mass spectrum is generated using the regularized inversion algorithm. The step 520 may be carried out by the deconvolution module 420. The perturbed mass spectrum is generated based on (or from) the time varying transient signal 101. As with the step 510 it will be appreciated that the step 520 may comprise applying (or performing) the regularized inversion algorithm directly on the time-varying transient signal 101.

The values of the one or more adjustable parameters are used to generate the perturbed mass spectrum in the step 520 form a perturbed version of the first set of values. A perturbed version of the first set of values is a set of values where at least one of the values differs from the corresponding value in the first set of values. The difference (or differences) between the values in the first set of values and the values in the perturbed version of the first set of values is typically small relative to the size of the value in question. However, it will be appreciated that in some cases the difference may be large.

The step 520 may be repeated to form a plurality of perturbed mass spectra. Each perturbed mass spectra of the plurality being generated using a respective perturbed version of the first set of values. It will be understood that the various perturbed versions of the first set of values will differ by one or more values.

Figure 5B:
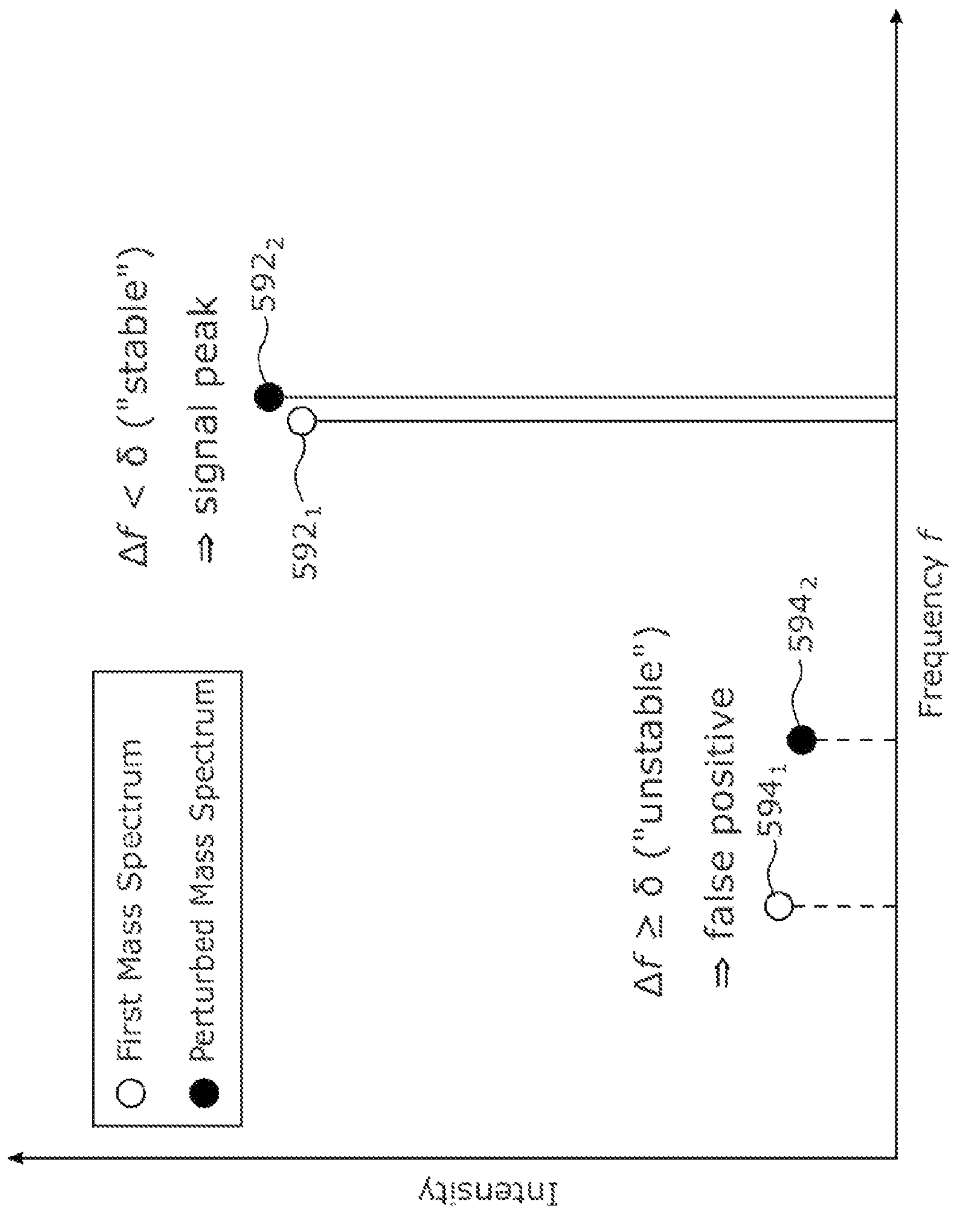
FIG. 5B shows a first mass spectrum corresponding to a set of converged values for the set of parameters and a perturbed mass spectrum corresponding to a perturbed version of the set of values for the parameter set.

At a step 530 one or more spurious peaks in the first mass spectrum are identified by comparing the first mass spectrum with at least one of the perturbed mass spectra. Whilst the comparison of the mass spectra may be performed in the mass (m/z) domain, it is typically more efficient to perform the comparison in the frequency domain. The step 530 may be carried out by the comparison module 440. As set out above, peaks may be labelled as spurious if they are unstable. An unstable peak may be defined as a peak whose frequency varies by more than a threshold amount between two or more mass spectra. An example of this is shown in FIG. 5B which shows two mass spectra, a first mass spectrum corresponding to a set of converged values for the set of parameters and a perturbed mass spectrum corresponding to a perturbed version of the set of values for the parameter set. The two peaks 592$_1$ and 592$_2$ of the first mass spectrum and perturbed mass spectrum respectively have a frequency difference $\Delta f$ less than (or within) the predetermined threshold $\delta$ and hence are determined to be stable. The two peaks 594$_1$ and 594$_2$ of the first mass spectrum and perturbed mass spectrum respectively have a frequency difference $\Delta f$ greater than (or outside) the predetermined threshold $\delta$ and hence are determined to be unstable.

Additionally, or alternatively, a peak may be identified as spurious if that peak is not present in both the first mass spectrum and all of the perturbed mass spectra. A peak may also be identified as spurious if it appears in less than a pre-determined number of the perturbed mass spectra. It will be appreciated that such spurious peaks may be further classified based on which criteria they have met or not met. For example, a peak that it appears in less than a pre-determined number of the perturbed mass spectra may be identified as such (for example using the tag "suspect") whereas a peak that only appears in the first mass spectra and none of the perturbed mass spectra may be defined as "invalid".

It will be appreciated that the step 530 may further comprise outputting said identification in a suitable form. The spurious peaks may be outputted directly as data representing a set of spurious peaks 145. Additionally, or alternatively, a revised mass spectrum 151 may be outputted. The revised mass spectrum may correspond to the first mass spectrum 390 with the one or more spurious peaks removed. Alternatively, the revised mass spectrum may correspond to the first mass spectrum 390 with the one or more spurious peaks marked (or otherwise identified) as spurious. Equally, it will be appreciated that where the spurious peaks have been further categorized, this further categorization may form part of the output in a similar manner.

In the above discussions it will be understood that the identification of spurious peaks is improved as the spurious peaks, which are artefacts of the regularized inversion are more sensitive to changes in the values of the parameters used for the regularized inversion than the true (or valid) peaks. This is set out in detail in annex A. As a result, by comparing perturbed mass spectra with the first mass spectrum spurious peaks may be identified. It will be appreciated that such identification can be carried out in any number of ways based on this difference in sensitivity between the true and spurious peaks. As such the specific criteria for identification set out above are merely exemplary.

To better understand the invention various specific examples are now discussed with reference to particular regularized deconvolution algorithms. It will be appreciated however that the invention is not limited to the use of these particular deconvolution algorithms.

Figure 6A:
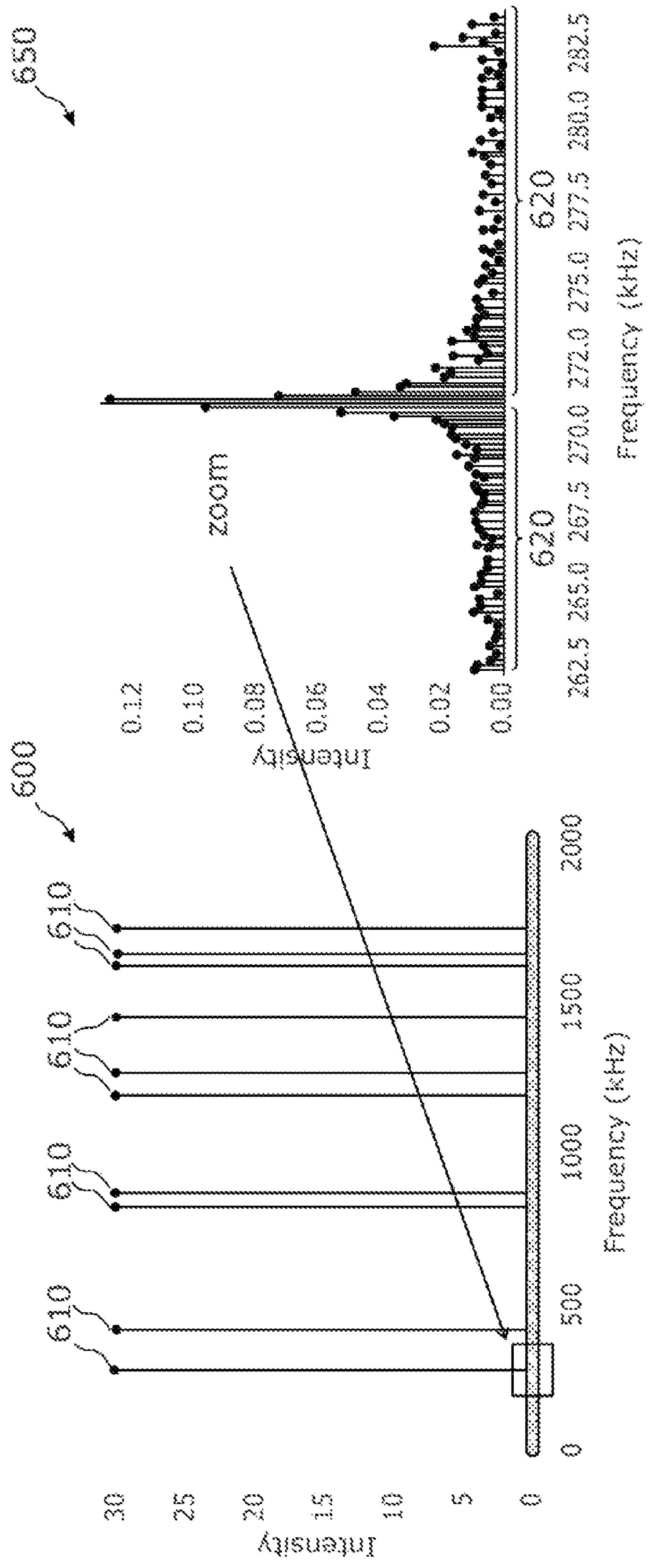
FIG. 6A shows a mass spectrum in the form of a frequency vs. intensity graph, produced by applying a phase constrained spectrum deconvolution method to an artificially generated noiseless initial mass spectrum.

FIG. 6A shows a mass spectrum 600, in the form of a frequency vs. intensity graph, produced by applying PSDM to an artificially generated noiseless initial mass spectrum.

In this example the transient was generated via the following steps:

- A random mass list and constant corresponding abundance list of the known components of the calibration mixture was obtained;
- The mass list and abundance list were converted to the frequency domain;
- A transient in time domain was generated by a linear superposition of the harmonic components;
- Transient intensity noise has been neglected to point out that artifacts still show up for vanishing noise levels.
- Transient decay has been neglected for this minimal example.

The transients were digitized according to the sample rate (4996 kHz), A/D discretization (+/−32768 integer steps) and acquisition length (65536 samples) to emulate common experimental settings.

A number of peaks 610 are shown in the mass spectrum 600. However, as the zoomed portion 650 of the mass spectrum 600 shows there are a number of spurious peaks 620 present in the mass spectrum 600. These are due to the inherent ill-conditioned and ill-posed nature of the deconvolution problem.

As discussed previously the PSDM approach uses a phase constraint, in the form of a feasibility cone in the complex solution plane, on the calculated complex amplitudes for its regularization. However, in the artificially generated natal mass spectra discussed above the expected phase of the complex amplitudes is known exactly (by construction). Nevertheless, even all of the input parameters (including the initial phase) being exactly known without any uncertainty, the underlying discrete deconvolution problem remains ill-conditioned, leading to spurious peaks 620 in the resulting PSDM mass spectrum 600, as can be seen from FIG. 6A. As set out in annex A this is inherent to any regularized inversion algorithm, and not just applicable to PSDM techniques.

Figure 6B:
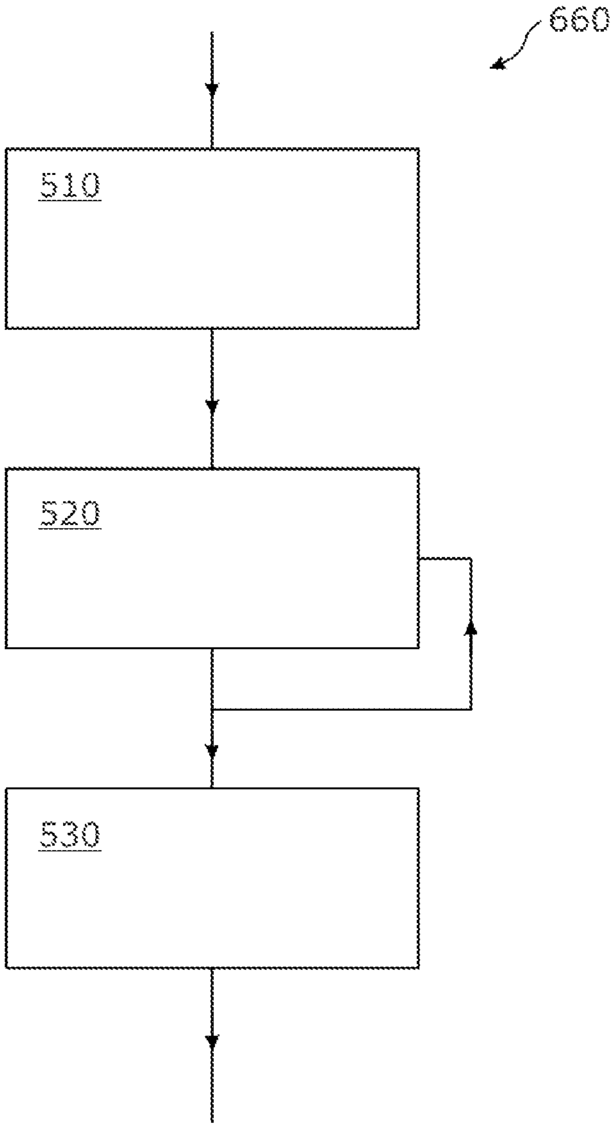
FIG. 6B shows a flow diagram schematically illustrating a variant of the method described previously in relation to FIG. 5 where the regularized inversion algorithm is a phase constrained spectrum deconvolution method.

FIG. 6B shows a flow diagram schematically illustrating a variant 660 of the method 500, described previously in relation to FIG. 5A, for identifying spurious peaks in a mass spectrum. The variant method 660 is an example of the method 500 where the regularized inversion algorithm is a phase constrained spectrum deconvolution method. Phase constrained spectrum deconvolution methods are discussed in more detail in annex B, however it will be appreciated that they are well known to the skilled person. The variant method 660 is as the method 500 described above apart from the differences set out below. The time varying-transient signal 101 in this case is generated using a FTMS type mass spectrometer 10.

At the steps 510 and 520 the regularized inversion algorithm comprises a phase constrained spectrum deconvolution method. The set of parameters may comprise any combination of: the number of zero-blanked entries of the transient; the cut-off number of iterations in the iterative optimization of PSDM, or the weighting of optional penalty terms (L1-penalty, L2-penalty) in the optimization problem. It has been found that using one or both of the number of zero-blanked entries of the transient and the cut-off number of iterations in the iterative optimization of PSDM as the parameters whose values are changed in the perturbed versions of the values of the set of parameters is particularly advantageous. The variation of the number of zero-blanked entries of the transient results in a considerably different frequency distribution of spectral artefacts, whilst the variation of the cut-off number of iterations presents another degree of freedom which is not as sensitive to small perturbations. Typically, the computational time scales directly with the cut-off number of iterations, whereas the number of zero-blanked entries tends to have a negligible effect on computation time. By varying both a reasonable compromise between computational effort an accuracy of identification can be achieved.

As such, at the step 510 a PSDM calculation with standard (or converged) values for the number of zero-blanked entries of the transient and the cut-off number of iterations may be performed. For example, the PSDM calculation is converged with respect to the number of zero-blanked entries of the transient when the initial part of the transient that represents the ramping of voltages in the ion trap is fully blanked. It will be appreciated that voltage ramping can usually be clearly identified at the beginning of a transient by inspection, as a large non-periodic signal. This produces the first mass spectrum 390.

At the step 520 a perturbed mass spectrum $\mathbf{390}_1$ is calculated using PSDM and a perturbed set of values of the set of parameters. The perturbed set of values may comprise modified values for both the number of zero-blanked entries of the transient, and the cut-off number of iterations in the iterative optimization of PSDM. Alternatively, may comprise a modified value for only one of the number of zero-blanked entries of the transient, and the cut-off number of iterations in the iterative optimization of PSDM. For reasons of computational efficiency, the number of iterations may be reduced in the perturbed set of values and/or the number of blanked portions may be increased. However, it will be appreciated that the invention is not limited to such perturbations.

As set out previously the step 520 may be repeated to produce a number of perturbed mass spectra $\mathbf{390}_1, \ldots, \mathbf{390}_N$.

In the step 530 spurious peaks may be identified by comparing two or more of the mass spectra, as described previously.

Figure 6C:
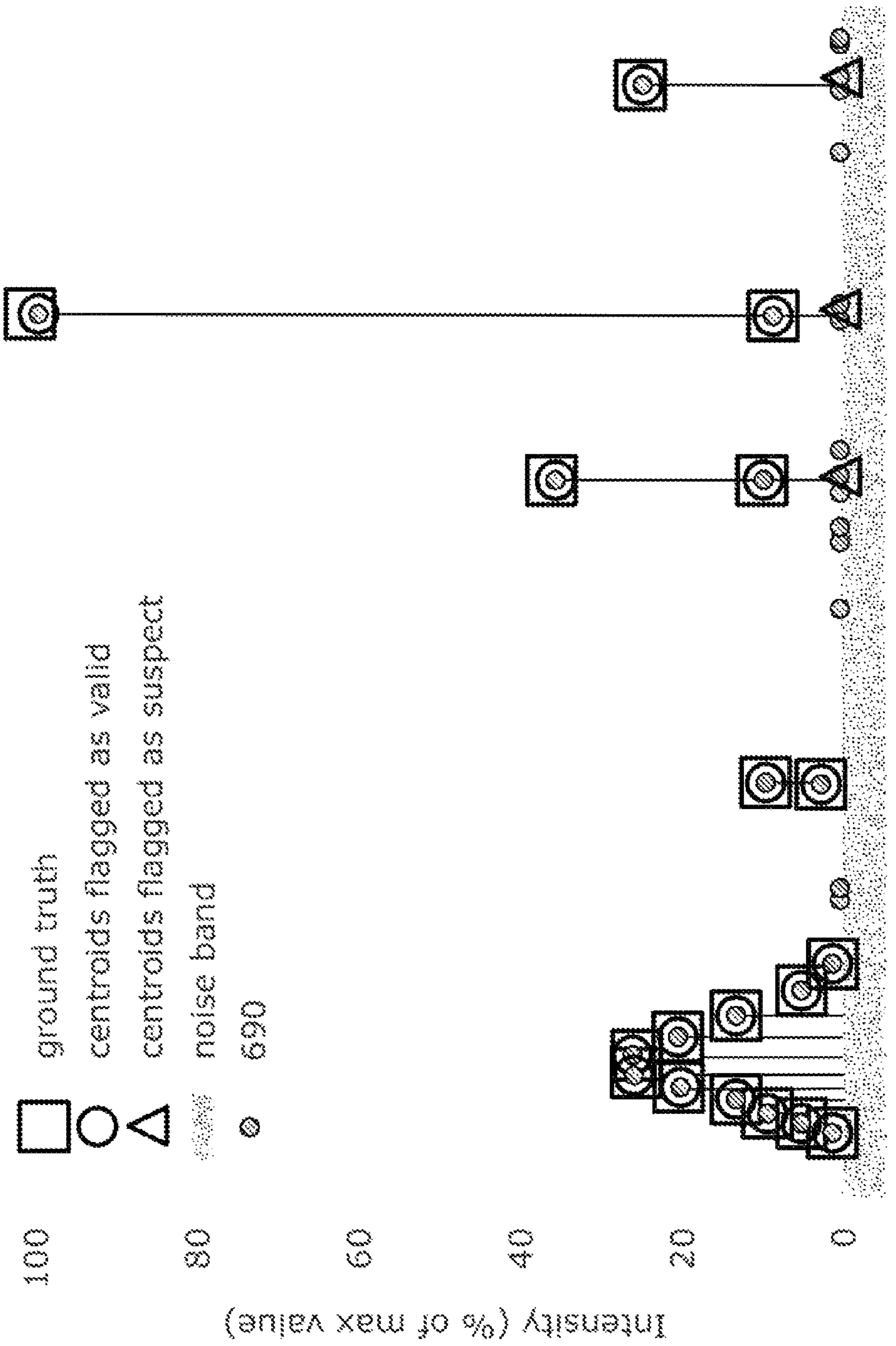
FIG. 6C shows a mass spectrum resulting from a method such as the method shown in FIG. 6B where a number of spurious peaks have been identified.

FIG. 6C shows a mass spectrum resulting from a method such as the method 600 shown in FIG. 6B where a number of spurious peaks have been identified. The mass spectrum shown in FIG. 6C is an in silico spectrum from an artificially generated calibration mixture ("CalMix") transient including artificially generated noise. The time varying transient was generated based on the peaks 690 indicated as "ground truth" in FIG. 6C. The total length of the transient was 262144 entries (this corresponds to 64 ms at a 4096 kHz sample rate). In this example the transient was generated via the following steps:

- A mass list and relative abundance list of the known components of the calibration mixture was obtained;
- The mass list and relative abundance list were converted to the frequency domain;
- A transient in time domain was generated by a linear superposition of the harmonic components, together with a quadratic phase-over-frequency function;
- Phase noise and transient intensity noise generated using a pseudo-random number generator was added. The probability distributions and distribution parameters (e.g. the variances, correlation times etc.) were chosen according values previously measured experimentally;
- A decay constant of 2.25 1/s of the signal was emulated in accordance with a decay constant previously measured experimentally.
- The transients were digitized according to the sample rate, A/D discretization and dynamic range in line with an example measurement instrument.

The transients were digitized according to the sample rate (4996 kHz), A/D discretization (+/−32768 integer steps) and acquisition length (262144 samples) to emulate common experimental settings.

For the first mass spectrum the cut-off number of iterations, $n_{iter}$, used was 50, and the number of blanked entries, $N_{zb}$, in the transient was 1876. Two perturbed mass spectra were generated, one with $n_{iter}=3$ and $N_{zb}=1876+400$, the other perturbed mass spectra had $n_{iter}=20$ and $N_{zb,2}=1876+200$. When identifying the spurious peaks, a peak was considered stable if under a change of parameters the frequency did not change by more than half a bin width. Peaks marked as valid, with a circle, satisfy the criteria that said peaks were in the intersection of all three mass spectra with regard the above stability criteria. Peaks marked as suspect, with a triangle, satisfy the criteria that they are in the intersection of the first mass spectrum 390 and only one of the perturbed mass spectrum. Additionally, a noise band is shown which shows the intensity threshold below which peaks are considered to be noise.

Figure 7:
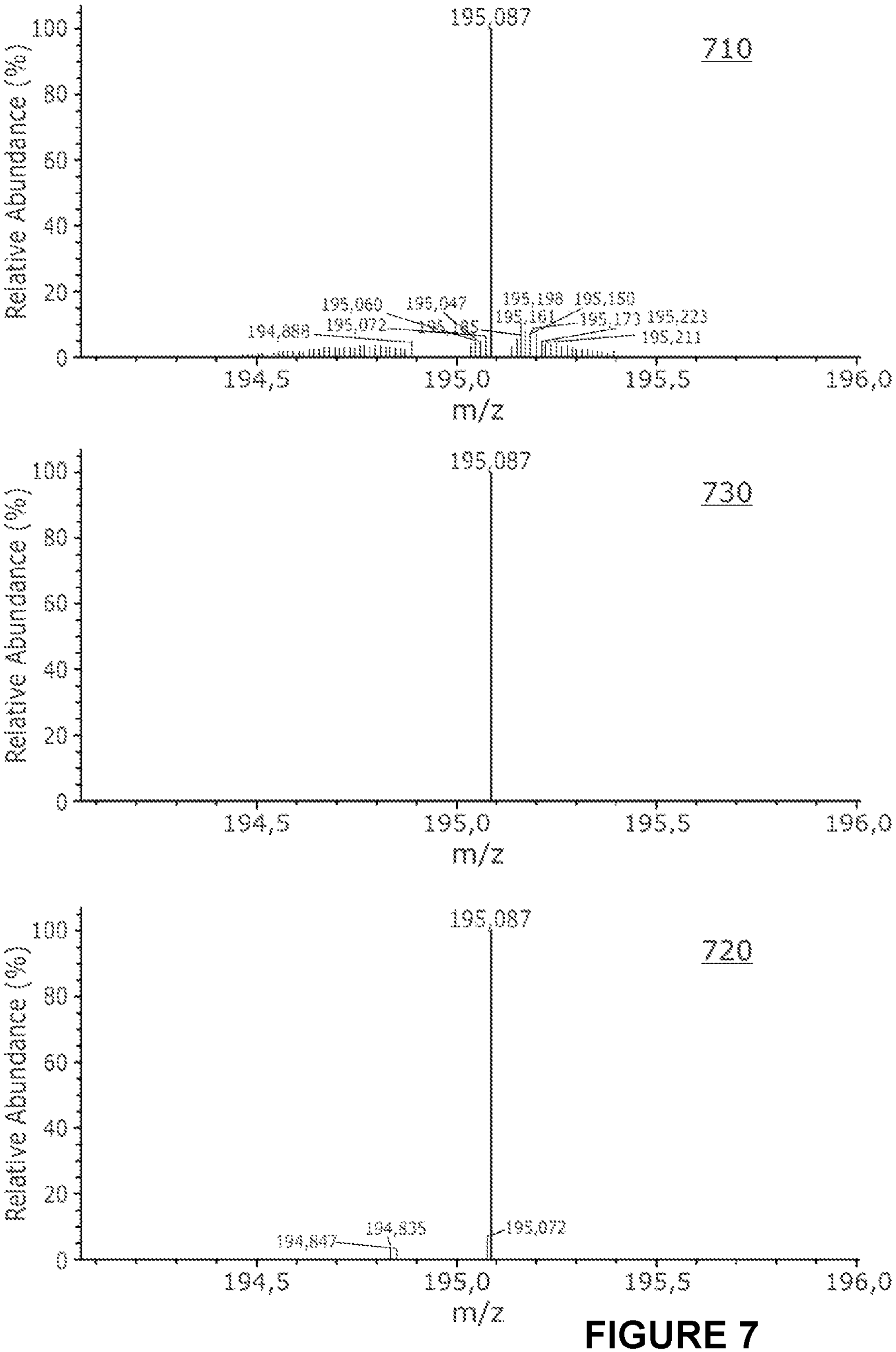
FIG. 7 shows three mass spectra generated from a CalMix sample in a mass spectrometry experiment using a Q Exactive™ HF-X Hybrid Quadrupole-Orbitrap™ Mass Spectrometer processed according to a method of the invention.

In FIG. 7 three mass spectra 710; 720; 730 are shown that are generated from a commercially available CalMix sample in a mass spectrometry experiment using a Q Exactive™ HF-X Hybrid Quadrupole-Orbitrap™ Mass Spectrometer, where the transient has been processed in the same manner as described above in FIG. 6C. The transient settings sample rate and acquisition length were the same like in the above mentioned in silico example. The PSDM phase parameters were obtained by a calibration procedure which fits the frequency-phase dispersion relation to a quadratic function by use of the very same CalMix reagent. The mass spectrum 710 corresponds to the first mass spectrum and shows a central caffeine peak surrounded by what is suspected to be false positive peaks. The mass spectrum 720 shows the first mass spectrum with some of the false positive peaks removed by way of the method of the invention. This mass spectrum 720 includes the peaks marked as valid and the peaks marked as suspect. The mass spectrum 730 shows the first mass spectrum with only the peak marked as valid, which is the central caffeine peak. This demonstrates the successful removal of the false positive peaks using a method of the invention.

Modifications

It will be appreciated that the methods described have been shown as individual steps carried out in a specific order. However, the skilled person will appreciate that these steps may be combined or carried out in a different order whilst still achieving the desired result.

Whilst the above discussions have generally referred to Fourier transforms it will be appreciated that the methods and systems herein are generally applicable to any form of suitable transform. A suitable transform would be understood by the skilled person as one suitable for the particular mass spectrometry experiment, in particular the particular type of mass analyser, used to generate the transient signal.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

Annex A

The herein presented invention makes use of the inherent instability of the underlying deconvolution procedure to the space of input parameters. Particularly, the large sensitivity of the frequency positions of false positive solutions (which correspond to spurious peaks in the resulting mass spectrum) to small variations in the convolution kernel is used to classify peaks as valid or not. There now follows a discussion of the mathematics that demonstrates that this is indeed the case. The discretized transient $S_{t_k}$, as discussed above may be set out as:

$$S_{t_{k_t}} = w_k x_k,\ k = 0 \ldots N-1, \tag{1}$$

where $w_k$ is a window function and $x_k$ corresponds to the discretized but un-windowed transient value at time $t_k$. The acquisition time of the original time-varying transient signal in this example would be from $t_0$ to $t_{N-1}$ and the discretised transient would comprise N samples. The window function would, in the simplest case, project out the acquisition time window, with $w_k=1$ for $0 \le k \le N-1$, and $w_k=0$ for other values of k. Such a windowing function is typically known as a Boxcar window. In this simple case the discretised transient would reduce to $S_{t_k}=S(t_k)$ as set out above.

It will be appreciated that the windowing function may be more complex in order to account for additional effects such as decay or de-phasing. For example, decay might be manifested in a (multi-)exponential decay of the envelopes of the transient. Additionally, or alternatively the windowing function may include additional signal processing window functions (e.g., as commonly used for sidelobe reduction) Applying a discrete Fourier transform (DFT) to the discretised transient produces a set of complex amplitudes $c_n$ each at corresponding frequencies $f_n$ of the Fourier grid defined by the discrete Fourier transform. Each frequency corresponds to a particular m/z ratio and the complex amplitude for a given frequency (and hence m/z value) is proportional to the relative abundance of the ionic species having that m/z ratio. As such the complex amplitudes $c_n$ and their corresponding frequencies $f_n$ form (or represent) a mass spectrum.

For a typical case where the above mentioned boxcar window is used the separation between adjacent frequencies in the set of frequencies is determined by the inverse of the duration of the transient $$\frac{1}{T}.$$

It will be appreciated that such complex amplitudes $c_n$ are convolutions of the true complex amplitudes $a_n$ and a convolution kernel. We may then write $c_n$ as:

$$c_n=(\psi \otimes a)_n=\Sigma_{k=0}^{K-1}\psi_k a_{[k-n]_N},\ n=0 \ldots N-1, \tag{2}$$

Here, $\psi_k=\mathrm{DFT}(w_t)$ (which directly follows from the discrete form of the convolution theorem in Fourier analysis) is the convolution kernel defined on a set of cardinality K, . . . $\otimes$ . . . denotes the commutative cyclic convolution operation and $[k-n]_N:=(k-n) \bmod N$ reflects the N-periodic nature of the discrete Fourier transform. Without loss of generality for the forthcoming conclusions, the above formulae assume that $\psi$ and a are each sampled on grids of equidistant and commensurate points. The first assumption is relaxed in PSDM to achieve super-DFT resolution, but the condition $\{k\}=\{n\}$ is subsequently restored by means of zero padding interpolation in the co-domain upon every iteration step.

As such, in order to obtain the true complex amplitudes (and therefore the true mass spectrum) a process is used to attempt to de-convolve the kernel $\psi_k$ and the true complex amplitudes $a_k$. This de-convolution problem can be reformulated as matrix-vector multiplication $$c=\Psi a \tag{3}$$

with the square-shaped matrix $$\Psi := \begin{pmatrix} \psi_0 & \psi_{N-1} & \psi_{N-2} & \cdots & \psi_1 \\ \psi_1 & \psi_0 & \psi_{N-1} & \cdots & \psi_2 \\ \psi_2 & \psi_1 & \psi_0 & \cdots & \psi_3 \\ \cdots & \cdots & \cdots & \cdots & \cdots \\ \psi_{N-1} & \psi_{N-2} & \psi_{N-3} & \cdots & \psi_0 \end{pmatrix}. \tag{4}$$

This matrix is a so-called circulant matrix, i.e., all rows are cyclic permutations of the first row. It will be appreciated that in the continuous limit $\Delta t \rightarrow 0$ and the simplest continuous boxcar window case $0 \le t \le T$ with acquisition time T, $\psi_k$ can be identified with the function $\Psi(n, k)$ as set out in paragraph 88 of patent application EP3086354 which discusses PSDM. It is known from matrix algebra that any matrix (hence also $\Psi$) can be decomposed as $$\Psi=UDV^{\dagger}=U\mathrm{diag}(d_k)V^{\dagger}, \tag{5}$$

with unitary matrices U, V, the conjugate transpose indicated by $^{\dagger}$ and a positive-semidefinite diagonal matrix $D=\mathrm{diag}(d_k)$. The $d_k$ constitute the singular values of $\Psi$. The condition number of an invertible matrix is defined as the ratio of the largest to the smallest singular value of the matrix $\Psi$:

$$cond(\Psi) = \frac{\max(d_k)}{\min(d_k)} = \|\Psi\|\ \|\Psi^{-1}\| \tag{6}$$

and constitutes a measure for the loss of accuracy upon the solution of a linear system with mapping $\Psi$. This definition for condition number is well known, see for example Cheney, E. W. and Kincaid, D. R., "Numerical Mathematics and Computing", 6th edition, Brooks/Cole Publishing Co (2007), It will be appreciated that for non-rectangular and/or non-invertible matrices (both of which being cases occur in super-resolved Fourier deconvolution), the inverse kernel $\Psi^{-1}$ is replaced by the Moore-Penrose pseudo-inverse $\Psi^{+}$, see for example Moore, E. H., "On the reciprocal of the general algebraic matrix." Bulletin of the American Mathematical society. 26 (9): 394-95 (1920). For legibility, we will maintain $\Psi^{-1}$ from now on, however the skilled person will appreciate that this may be substituted for the Moore-Penrose pseudo-inverse $\Psi^{+}$ where appropriate. It can be shown that the base-b logarithm of cond($\Psi$) estimates how many base-b digits can be lost upon every usage of $\Psi$ in an already backward-stable algorithm.

It will be understood that the condition number and its implications does not arise just because a particular algorithm for solving equation (3) is used. Rather the condition number is an inherent property of the mathematical mapping itself. This can be seen from the inversion of the linear deconvolution problem in equation (3) when augmented by a component $\epsilon$. Such a component $\epsilon$ may be used to take account of any one or more of: instrument noise, round-off errors, and other uncertainties. Here equation (3) and its solution becomes:

$$c=\Psi a+\epsilon \Rightarrow \Psi^{-1}c=a+\Psi^{-1}\epsilon. \tag{7}$$

It will be appreciated that due to the submultiplicative property of any induced norm $\|\ldots\|$, the error of the inverse mapping can then be bounded by:

$$\|\Psi^{-1}\epsilon\| \le \|\Psi^{-1}\|\|\epsilon\|. \tag{8}$$

Hence, if $\|\Psi^{-1}\|$ is large enough, the error $\|\Psi^{-1}\epsilon\|$ can be large even for arbitrarily small noise levels $\|\epsilon\|$. From the singular value decomposition, we additionally find $$\Psi^{-1}=VD^{-1}U^{\dagger},\ D^{-1}=\mathrm{diag}(d_k). \tag{9}$$

where $d_k$ are the singular values of $\Psi^{-1}$. Therefore, any full solution $\Psi^{-1}c$ can contain a maximal noise amplification by components of $\epsilon$ that have been scaled with the inverse of the smallest singular values of $\Psi^{-1}$, i.e., $\min(d_i^{-1})$. It will also be appreciated that any numerical inversion will be hampered by large condition numbers. This is because $D^{-1}$ then contains floating point numbers on many scales, which amplifies any truncation errors.

By construction, circulant matrices like $\Psi$ are diagonalized by the discrete Fourier transform. As such, the eigenvalues $\lambda_j$ of $\Psi$ are given as $$\lambda_j = \sum_{k=0}^{N-1} \psi_k \omega_j^{-jk},\ \omega = e^{2\pi i/N},\ j = 0, \ldots, N-1. \tag{10}$$

Thus, the eigenvalues can be obtained from a discrete Fourier transform of the first column of $\Psi$, as this equation is the standard definition of the unscaled forward transform $\lambda_k=\mathrm{DFT}(\psi_k)$.

By definition, the singular values $d_i$ are the nonnegative square roots of the eigenvalues of $\Psi^{\dagger}\Psi$. This can be shown by usage of the properties $VV^{\dagger}=\mathbb{1}$, $U^{\dagger}U=\mathbb{1}$ (unitarity of these matrices):

$$\Psi^{\dagger}\Psi=VD^{\dagger}U^{\dagger}UDV^{\dagger}=VD^{\dagger}DV^{\dagger}=\mathrm{diag}(|d_k|^2)=\mathrm{diag}(\lambda_k).$$

If the window function $w_t$ is real-valued, $\Psi$ is also symmetric as the discrete Fourier transform spectrum is Hermitian, i.e., $\psi_k=[\psi_{(-k)}]^*$. It will be appreciated that, following standard linear algebra, $\mathrm{diag}(|d_k|)=\mathrm{diag}(\lambda_k)$ if $\Psi$ is invertible. In summary, in view of the above, it will be understood that the condition number for the deconvolution is then given by:

$$cond(\Psi) = \frac{\max(d_k)}{\min(d_k)} = \frac{\max(|\lambda_k|)}{\min(|\lambda_k|)} = \frac{\max[DFT(\psi_k)]}{\min[DFT(\psi_k)]} = \frac{\max(w_t)}{\min(w_t)}. \tag{12}$$

It will be appreciated that this result is independent of the particular deconvolution algorithm used.

As such it is not feasible to naively invert a N×K, (K>N) convolution matrix which results from the boxcar-like acquisition-time window $w_t$ (with range {1, 0}) to enhance resolution from N to K data points. The zero-valued entries in $w_t$ will render $\Psi$ non-invertible and cause the condition number to diverge. This cannot be circumvented by the substitution of zeros with very small approximate "floating-point zeros", as we then still have $\min(w_t) \ll \max(w_t)$ and hence $cond(\Psi) \gg 1$ which renders the inversion unstable due to ill-conditioning.

Whilst this result has been shown based on the use of a boxcar-like acquisition time window it will be appreciated that the result applies generally to any naïve inversion of an N×K, (K>N) convolution matrix, and hence any naïve attempt to deconvolve a mass spectrum on an N point grid into a mass spectrum on a K point grid. This is because any such deconvolution operation may be mapped to the above inversion (see again in Mueller, J. L., Siltanen, S., "*Linear and Nonlinear Inverse Problems with Practical Applications*" (2012), Cambridge University Press. ISBN 978-1-61197-233-7).

If one properly uses a regularization technique in the deconvolution (or inversion) it is still be to be expected that a regularized solution's noise content is sensitive to any modification of the zero-valued entries in the window function $w_t$. In particular, additional zero-blanking of the transient entries corresponds to a larger portion of zero-valued singular values. Similarly, it will be appreciated that this will be the case regardless of the inversion algorithm used, or the regularization for any FT-related inversion scheme that aims to deconvolute spectra to revert the effect of window functions as defined in Eq (1).

Annex B—Phase Constrained Spectrum Deconvolution Methods

Examples of phase constrained spectrum deconvolution methods are set out in detail in Grinfeld, D., Aizikov, K., Kreutzmann, A., Damoc, E., and Makarov, A., "Phase-constrained spectrum deconvolution for Fourier transform mass spectrometry." Anal. Chem., 89 (2): 1202-1211 (2017), and in European patent application EP3086354. Such methods would be well known to the skilled person and are not discussed in detail herein.

In summary, phase constrained spectrum deconvolution methods typically involve generating a mass spectrum represented by a set of complex amplitudes on a Fourier grid having a separation that is less than the inverse of the length of the time varying transient signal. The generation of the mass spectrum is carried out by optimizing the complex amplitudes of the mass spectrum tom minimize a measure of difference between the complex amplitudes and corresponding complex amplitudes of an in ital. mass spectrum produced by a discrete Fourier transform of the time varying transient signal. The optimization is carried out subject to a constraint on the phase of the complex amplitudes of the mass spectrum.

In this way it will be understood that a phase constrained spectrum deconvolution method typically comprises the following steps.

Generating an initial mass spectrum form a time varying transient signal. This is typically achieved by performing a Fourier transform of the transient signal to produce a first set of complex amplitudes, where each of the complex amplitudes corresponds to a respective frequency of a first set of frequencies. The first set of complex amplitudes correspond to $\{c_n\}$ set out above in annex A. The first set of frequencies may be equally spaced in frequency. A second set of complex amplitudes is generated, where each of these complex amplitudes corresponds to a respective frequency of a second set of frequencies. The second set of complex amplitudes correspond to $\{a_k\}$ set out above in annex A. The second set of frequencies may be equally spaced in frequency. The second set of frequencies may have a spacing (or a minimum spacing) that is less than that of the first set of frequencies. The second set of frequencies may have a spacing (or a minimum spacing) that is less than the inverse of the duration of the transient signal. The second set of complex amplitudes may cover (or span or correspond to) the same frequency range as the first set of complex amplitudes, and so the second set may contain more complex amplitudes than the first set. Hence, the second set of complex amplitudes may provide greater resolution.

The second set of complex amplitudes is optimized to produce an improved second set of complex amplitudes. At least some of the complex amplitudes from the improved second set are used to generate and display a mass spectrum. The improved second set of complex amplitudes provides a better quality mass spectrum.

Optimizing the second set of complex amplitudes comprises varying at least one of the complex amplitudes of the second set based on (or in dependence on) an objective function. For example, the at least one complex amplitudes may be varied with the aim of obtaining a substantially extremum value of the objective function. Optionally, all of the complex amplitudes from the second set may be varied as part of the optimizing step, or a subset may be optimized as part of the optimizing step.

The optimization is performed subject to a constraint. That is, for at least some of the complex amplitudes of the second set, a constraint is placed on the phase of each of the at least some complex amplitudes relative to one or more expected phases. The expected phases may be frequency-dependent. The objective function depends on one or more complex amplitudes of the first set of complex amplitudes and one or more complex amplitudes of the second set of complex amplitudes. The objective function may, for each frequency of the first set of frequencies, relate one or more complex amplitudes of the second set to the respective complex amplitude from the first set (such as by having the objective function a function of the one or more complex amplitudes of the second set and the respective complex amplitude from the first set). The constraint may be applied to all the complex amplitudes of the second set that are being varied as part of the optimizing step, or to a subset of those complex amplitudes.

It can be seen that by generating and optimizing a second set of complex amplitudes, the transient may be thought of as being decomposed onto a finer frequency grid. As the second set of complex amplitudes is not bound to the first set of complex amplitudes as a linear combination of these amplitudes, unlike in the interpolation method described previously, the resolution increases as the grid spacing of the second set of frequencies decreases. This leads to a much increased accuracy of the resulting mass spectrum. In other words, the method may be thought of as operating with two sets of frequencies. The first set of frequencies may comprise frequencies with a minimum separation of 1/T, where T is the time duration of the transient signal. The second set of frequencies may comprise the frequencies with a minimum separation less than 1/T. The second set of frequencies may contain the first set as a subset. Since the minimum spacing of the second set is less than that of the first set of frequencies, the second set of complex amplitudes may provide greater resolution.

Following the formalism of annex A above the objective function to be minimized may be cast as:

$$B(\{\alpha\}) = \sum_n \left\| \sum_k \Psi(n, k) a_k - c_n \right\|$$

A norm, ‖ . . . ‖, may be any convex norm. In particular the norm may be an $L_m$ norm i.e. any one of an $L_1$ norm; an $L_2$ norm; an $L_3$ norm; etc. As set out previously, in the continuous limit $\Delta t \rightarrow 0$ and the simplest continuous boxcar window case $0 \leq t \leq T$ with acquisition time T, $\psi_k$ of annex A can be identified with the function Ψ(n, k). The function Ψ(n, k) typically obeys the relation:

$$\Psi(n, k) = \frac{1}{T}\int_0^T e^{-2\pi i f_n t} e^{2\pi i F_k t} dt$$

which may also be represented as:

$$\Psi(n, k) = \frac{1}{2\pi i T}\frac{e^{2\pi i (F_k - f_n)T} - 1}{F_k - f_n}$$

where $F_k$ is the frequency of the complex amplitude $a_k$ and $f_n$ is the frequency of the complex amplitude $c_n$.

The optimizing is subject to one or more constraints based on expected phase data. In particular, the optimizing may be subject to, for at least some of the complex amplitudes of the second set of complex amplitudes, a constraint on the phase of each complex amplitude relative to a respective expected phase. A constraint may require an exact or substantially exact phase:

$$\arg a_k = \phi_k$$

Alternatively, a constraint may require (or impose or set or otherwise enforce) the phase of the respective complex amplitude of the second set of complex amplitudes be within a predefined range around (or substantially centred on, or within, or otherwise based on) the respective expected phase. For example, such a constraint may be represented as:

$$\phi_k - \Delta\phi \le \arg a_k \le \phi_k + \Delta\phi$$

The range may be any of: set by a user; based on the mass spectrometer 10; dependent on the frequency corresponding to the expected phase; based on the expected phase jitter of the mass spectrometer 10; etc.

The optimization step is often carried out using the using the Alternating Direction Method of Multipliers (ADMM) however any suitable numerical optimization technique of which many examples are known in the art e.g. such as Newton's method; a Quasi-Newton method; a conjugate gradient method; a steepest descent method; proximal minimization etc.

The optimization is iterative and may be complete (or successful or may terminate) when a value of the objective function is obtained that is suitably close (or estimated to be suitably close) to an extremum value (or estimated or predicted extremum value) of the objective function. The optimization described above may be complete if any of the following conditions are met:

(a) a predefined number of iterations is exceeded or met;
(b) the change in the value of an objective function with respect to a previous iteration is below a predefined threshold;
(c) the change in value (or values) of one or more complex amplitudes of the improved second set of complex amplitudes with respect to a previous iteration is below a predefined threshold;
(d) the change in value of one or more functions, each depending on one or more complex amplitudes of the improved second set of complex amplitudes, with respect to a previous iteration is below a predefined threshold;
(e) a predefined amount of time has elapsed;
(f) a predefined number of processor cycles have elapsed; etc.

It will be appreciated that any of these may represent a parameter of the PSDM and the set of adjustable parameters described herein may comprise any combination of these parameters.

The invention claimed is:

1. A method of identifying spurious peaks in a mass spectrum produced from a time-varying transient signal detected in a mass spectrometer, the method comprising:
generating, using a regularized inversion algorithm having one or more adjustable parameters, a first mass spectrum from the time-varying transient signal, according to a first set of values of said one or more adjustable parameters;
generating, using the regularized inversion algorithm, one or more perturbed mass spectra from the transient signal, according to one or more respective perturbed versions of the first set of values;
identifying one or more spurious peaks in the first mass spectrum by comparing the first mass spectrum with at least one of the perturbed mass spectra.

2. The method according to claim 1 wherein each step of generating comprises applying the regularized inversion algorithm to an initial mass spectrum generated from the time-varying transient signal.

3. The method according to claim 2 wherein the method further comprises forming the initial mass spectrum by applying a discrete Fourier transform to the time-varying transient signal.

4. The method according to claim 1 wherein the regularized inversion algorithm comprises applying a discrete Fourier transform to a version of the time-varying transient signal, said version of the time-varying signal comprising a number of zero blanked entries.

5. The method according to claim 4 wherein one of the one or more adjustable parameters controls the number of zero blanked entries in the version of the time-varying transient.

6. The method according to claim 1 wherein the regularized inversion algorithm is an iterative algorithm.

7. The method according to claim 6 wherein one of the one or more adjustable parameters controls the number of iterations in the regularized inversion algorithm.

8. The method according to claim 1 wherein the regularized inversion algorithm comprises a phase constrained spectrum deconvolution algorithm.

9. The method according to claim 1 wherein at least one of the spurious peaks is identified based on a change in the mass to charge ratio of the peak between the first mass spectrum and at least one of the perturbed mass spectrum exceeding a predetermined threshold.

10. The method according to claim 9 wherein the mass to charge ratio is represented as a frequency.

11. The method according to claim 1 wherein at least one of the spurious peaks is identified based on the absence of said peak from a intersection of the first mass spectrum and at least one of the perturbed mass spectra.

12. The method according to claim 1, further comprising outputting a revised mass spectrum wherein the identified one or more spurious peaks are excluded.

13. The method according to claim 1 wherein each perturbed version of the first set of values is formed by applying at least one respective change to at least one value of the first set of values.

14. A mass spectrometer system comprising:
an ion source;
an electrostatic trap mass analyzer adapted to receive and trap ions from the ion source and to generate a time-varying transient signal in response to oscillation of the ions within the electrostatic trap mass analyzer; and a computer system adapted to receive the time-varying transient signal from the electrostatic trap and comprising computer-readable instructions that are adapted to:

generate, using a regularized inversion algorithm having one or more adjustable parameters, a first mass spectrum from the time-varying transient signal, according to a first set of values of said one or more adjustable parameters;

generate, using the regularized inversion algorithm, one or more perturbed mass spectra from the transient signal, according to one or more respective perturbed versions of the first set of values; and identify one or more spurious peaks in the first mass spectrum by comparing the first mass spectrum with at least one of the perturbed mass spectra.

15. The mass spectrometer system according to claim 14, wherein the computer-readable instructions that are adapted to generate the first mass spectrum and to generate the one or more perturbed mass spectra are adapted to apply the regularized inversion algorithm to an initial mass spectrum generated from the time-varying transient signal.

16. The mass spectrometer system according to claim 15, wherein the computer-readable instructions are further adapted to form the initial mass spectrum by applying a discrete Fourier transform to the time-varying transient signal.

17. The mass spectrometer system according to claim 14, wherein the regularized inversion algorithm comprises applying a discrete Fourier transform to a version of the time-varying transient signal, said version of the time-varying transient signal comprising a number of zero blanked entries.

18. A computer-readable medium having computer-readable program instructions thereon that are adapted to:

read a time-varying transient signal generated by an electrostatic trap mass analyzer in response to oscillation of ions trapped therein;

generate, using a regularized inversion algorithm having one or more adjustable parameters, a first mass spectrum from the time-varying transient signal, according to a first set of values of said one or more adjustable parameters;

generate, using the regularized inversion algorithm, one or more perturbed mass spectra from the transient signal, according to one or more respective perturbed versions of the first set of values; and identify one or more spurious peaks in the first mass spectrum by comparing the first mass spectrum with at least one of the perturbed mass spectra.

19. The computer-readable medium according to claim 18, wherein the computer-readable instructions that are adapted to generate the first mass spectrum and to generate the one or more perturbed mass spectra are adapted to apply the regularized inversion algorithm to an initial mass spectrum generated from the time-varying transient signal.

20. The computer-readable medium according to claim 19, wherein the computer-readable instructions are further adapted to form the initial mass spectrum by applying a discrete Fourier transform to the time-varying transient signal.

21. The computer-readable medium according to claim 18, wherein the regularized inversion algorithm comprises applying a discrete Fourier transform to a version of the time-varying transient signal, said version of the time-varying transient signal comprising a number of zero blanked entries.

* * * * *